United States Patent
Honda et al.

(10) Patent No.: US 8,714,584 B2
(45) Date of Patent: May 6, 2014

(54) SIDE AIRBAG APPARATUS

(71) Applicant: Toyoda Gosei Co., Ltd., Kiyosu (JP)

(72) Inventors: Kensaku Honda, Kiyosu (JP); Yuji Sato, Kiyosu (JP); Masashi Hotta, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/753,598

(22) Filed: Jan. 30, 2013

(65) Prior Publication Data
US 2013/0200597 A1  Aug. 8, 2013

(30) Foreign Application Priority Data
Feb. 8, 2012 (JP) .................................. 2012-025254

(51) Int. Cl.
*B60R 21/207* (2006.01)
*B60R 21/233* (2006.01)
*B60R 21/2346* (2011.01)

(52) U.S. Cl.
USPC ..... 280/729; 280/730.2; 280/742; 280/743.1; 280/743.2

(58) Field of Classification Search
USPC .............. 280/729, 730.2, 742, 743.1, 743.2
See application file for complete search history.

(56) References Cited

U.S. PATENT DOCUMENTS

| | | | | |
|---|---|---|---|---|
| 5,718,450 A | * | 2/1998 | Hurford et al. | 280/730.2 |
| 5,791,685 A | * | 8/1998 | Lachat et al. | 280/743.1 |
| 5,913,536 A | * | 6/1999 | Brown | 280/730.2 |
| 5,924,721 A | * | 7/1999 | Nakamura et al. | 280/730.2 |
| 6,142,507 A | * | 11/2000 | Okuda et al. | 280/730.2 |
| 6,270,113 B1 | * | 8/2001 | Wipasuramonton et al. | 280/730.2 |
| 7,192,050 B2 | * | 3/2007 | Sato et al. | 280/729 |
| 7,384,062 B2 | * | 6/2008 | Yokoyama et al. | 280/730.2 |
| 7,431,329 B2 | * | 10/2008 | Taguchi et al. | 280/729 |
| 7,549,672 B2 | * | 6/2009 | Sato et al. | 280/730.2 |
| 7,607,682 B2 | | 10/2009 | Kurimoto et al. | |
| 7,637,530 B2 | | 12/2009 | Yamaji et al. | |

(Continued)

FOREIGN PATENT DOCUMENTS

| | | |
|---|---|---|
| EP | 2-412-585 A1 | 2/2012 |
| EP | 2-562-054 A1 | 2/2013 |

(Continued)

OTHER PUBLICATIONS

EP Office Action dated Apr. 18, 2013 to the corresponding EP patent application No. 13153111.3 (English translation).

*Primary Examiner* — Ruth Ilan
*Assistant Examiner* — Laura Freedman
(74) *Attorney, Agent, or Firm* — Posz Law Group, PLC

(57) ABSTRACT

An airbag includes a check valve in a communication passage connecting a lumbar-region-protecting inflatable portion and a shoulder-protecting inflatable portion. The check valve restricts outflow of inflation gas from the lumbar-region-protecting inflatable portion to the shoulder-protecting inflatable portion. A pressure regulation valve, which has an internal opening and a pair of valve body elements, is provided in a partitioning member between the shoulder-protecting inflatable portion and a thorax-protecting inflatable portion. Before an occupant is restrained by the shoulder-protecting inflatable portion, the valve body elements are pressed and contact with each other by inflation gas in the shoulder-protecting inflatable portion, thereby restricting flow of inflation gas at the internal opening. When the occupant is restrained by the shoulder-protecting inflatable portion, the valve body elements are flexed and separated from each other by external force applied following the restraining, thereby permitting flow of inflation gas at the internal opening.

5 Claims, 11 Drawing Sheets

(56) References Cited

U.S. PATENT DOCUMENTS

| | | |
|---|---|---|
| 7,661,699 B2 * | 2/2010 | Buhrlen et al. ............... 280/729 |
| 7,712,779 B2 | 5/2010 | Kim |
| 7,793,973 B2 * | 9/2010 | Sato et al. .................. 280/730.2 |
| 7,837,226 B2 | 11/2010 | Honda et al. |
| 7,926,838 B2 * | 4/2011 | Honda et al. .................. 280/729 |
| 8,480,128 B2 * | 7/2013 | Fukawatase et al. ....... 280/743.1 |
| 8,528,934 B2 * | 9/2013 | Kobayshi et al. ............. 280/740 |
| 8,562,015 B2 * | 10/2013 | Yamamoto .................... 280/729 |
| 2003/0168836 A1 * | 9/2003 | Sato et al. .................. 280/730.2 |
| 2006/0131845 A1 * | 6/2006 | Belwafa et al. ............... 280/729 |
| 2010/0140906 A1 | 6/2010 | Honda et al. |
| 2011/0298201 A1 | 12/2011 | Kobayashi et al. |
| 2012/0025499 A1 * | 2/2012 | Shibayama et al. ....... 280/730.2 |
| 2012/0248746 A1 * | 10/2012 | Yamamoto .................... 280/729 |
| 2013/0033022 A1 * | 2/2013 | Yamamoto ................. 280/730.2 |
| 2013/0200598 A1 * | 8/2013 | Honda et al. ............... 280/730.2 |
| 2013/0234421 A1 * | 9/2013 | Honda et al. .................. 280/729 |

FOREIGN PATENT DOCUMENTS

| | | |
|---|---|---|
| JP | 2004-262261 A | 9/2004 |
| JP | 2005-041457 A | 2/2005 |
| JP | 2007-314076 A | 12/2007 |
| JP | 2009-046110 A | 3/2009 |
| JP | 2009-137536 A | 6/2009 |
| JP | 2010-137615 A | 6/2010 |
| JP | 2010-184640 A | 8/2010 |
| JP | 2011-005908 A | 1/2011 |

\* cited by examiner

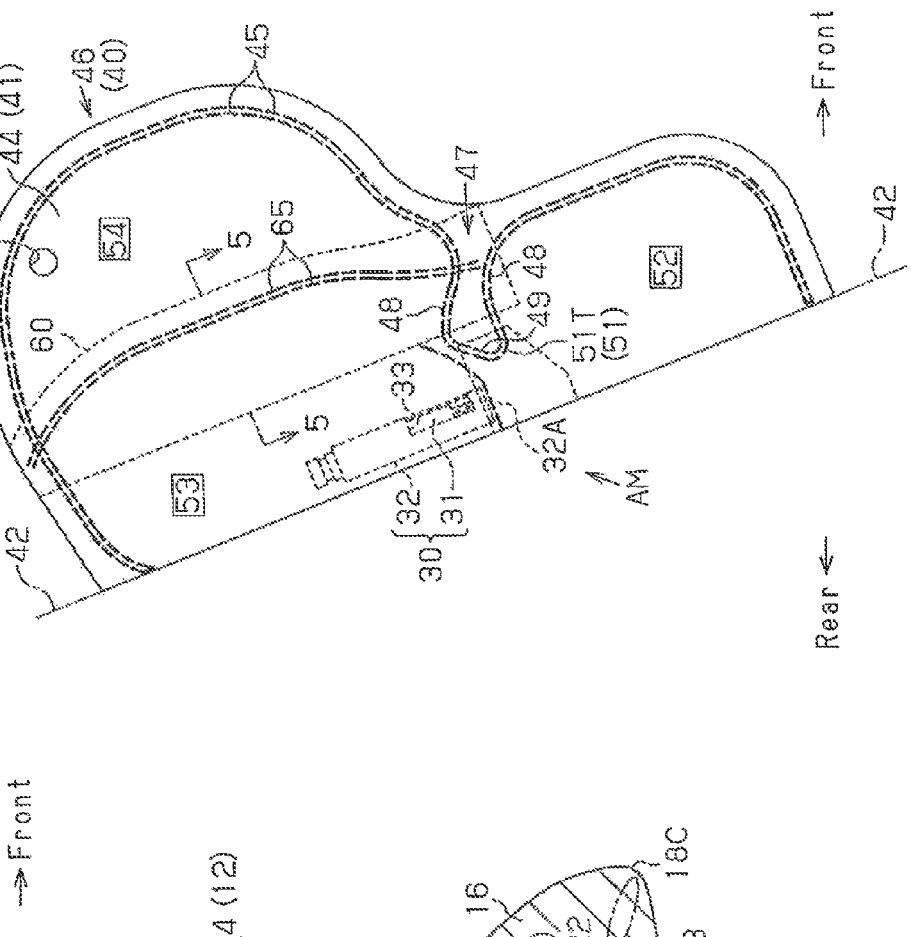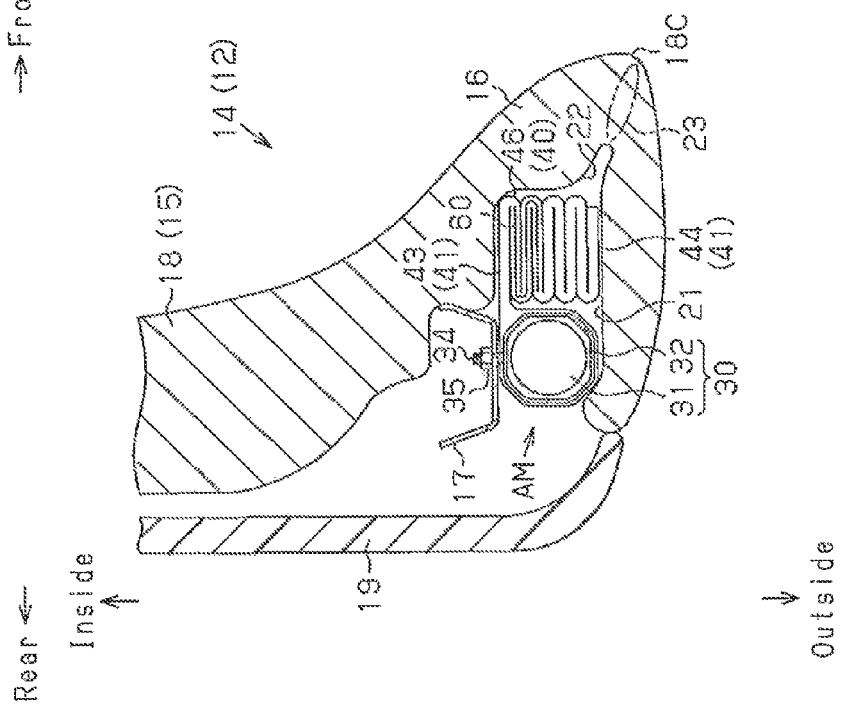

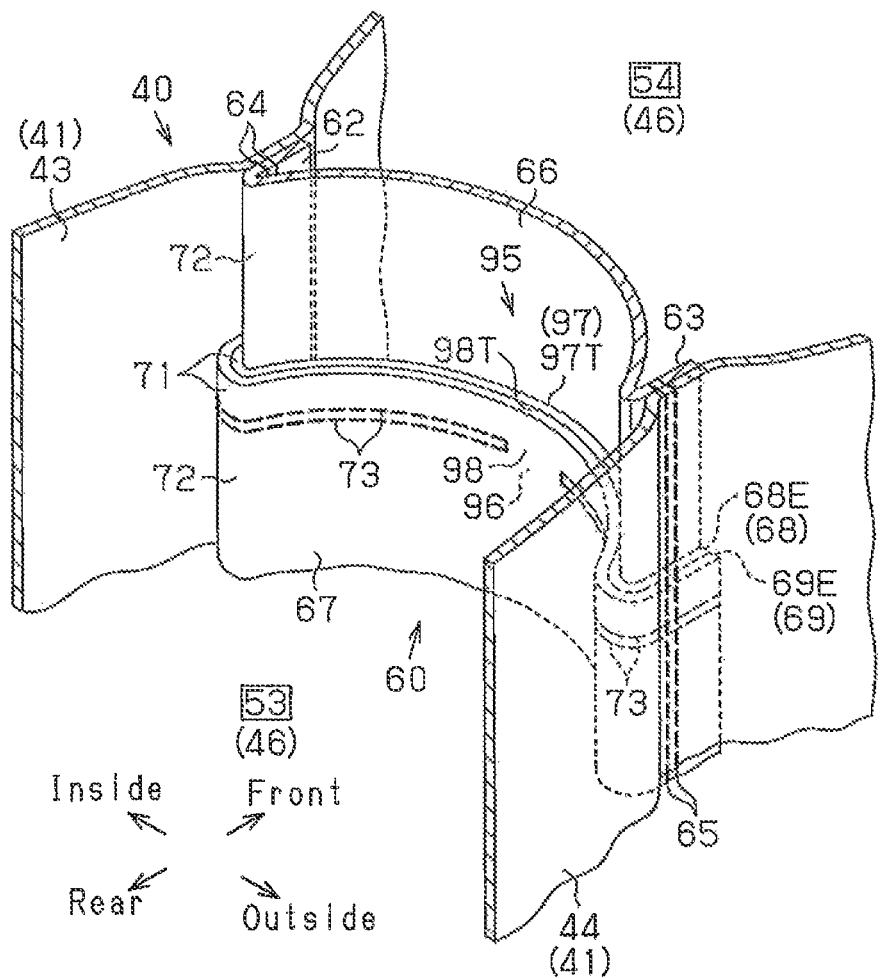

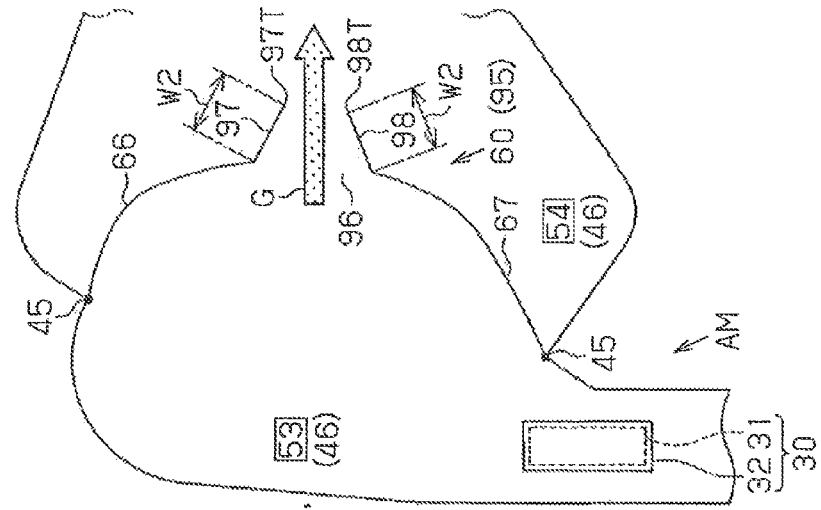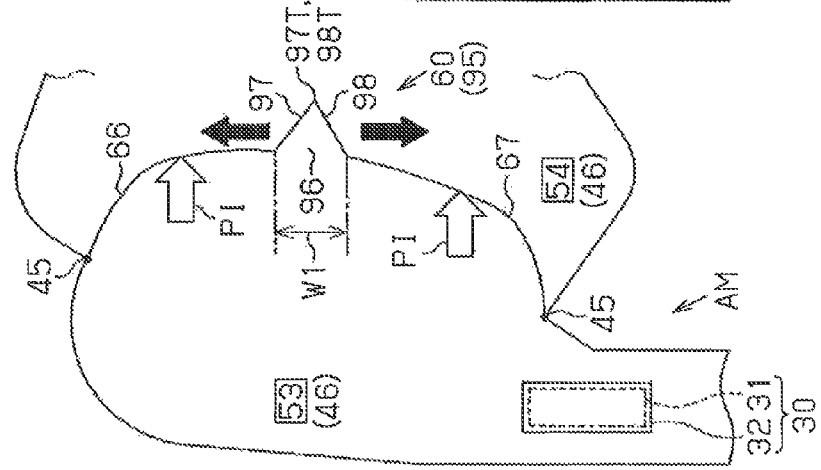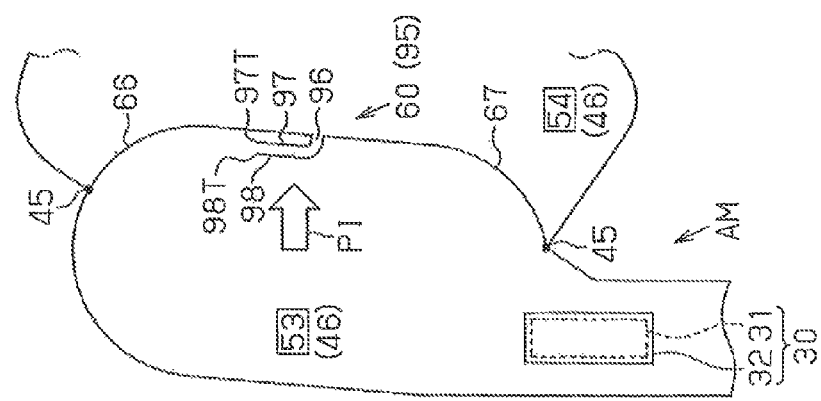

SIDE AIRBAG APPARATUS

BACKGROUND OF THE INVENTION

The present invention relates to a side airbag apparatus that protects an occupant from an impact by deploying and inflating an airbag at a side of the occupant seated in a vehicle seat.

This kind of a side airbag apparatus includes an airbag and an inflator. The airbag is incorporated in a seatback of a car seat, together with the inflator, in a folded state. When an impact is applied to a side door or the like from a lateral direction, the inflator supplies inflation gas into the airbag. Accordingly, the airbag is projected from the car seat with a part of the airbag remaining in the seatback. The airbag is deployed and inflated forward from a narrow space between the occupant and a body-side portion. The airbag is located between the occupant and the body-side portion, which protrudes into the passenger compartment in a deployed and inflated state. As a result, the airbag restrains the occupant and buffers the impact that is transmitted from the side to the occupant.

The side airbag apparatus protects a region from a lumbar region to a thorax of the occupant. Further, it is known that the lumbar region of the occupant has higher impact resistance than the thorax. Therefore, it is preferable that the impact that acts on the thorax of the occupant be reduced more than the impact that acts on the lumbar region. Accordingly, there is proposed a side airbag apparatus that includes an upper-protecting-inflatable portion and a lower-protecting-inflatable portion, which are connected to each other via a communication passage, and a check valve, which is provided in the communication passage and restricts outflow of the inflation gas from the lower-protecting-inflatable portion to the upper-protecting-inflatable portion.

According to this configuration, more inflation gas is supplied to the lower-protecting-inflatable portion than to the upper-protecting-inflatable portion. In this case, the lower-protecting-inflatable portion, which is located near the lumbar region of the occupant, is deployed and inflated at an internal pressure higher than that of the upper-protecting-inflatable portion, which is located near the thorax of the occupant. The check valve restricts outflow of the inflation gas in the lower-protecting-inflatable portion to the upper-protecting-inflatable portion. Therefore, the internal pressure of the lower-protecting-inflatable portion is maintained in a high state. Further, a vent hole for releasing surplus inflation gas in the upper-protecting-inflatable portion to the outside of the airbag is provided in the upper-protecting-inflatable portion. Accordingly, the internal pressure of the upper-protecting-inflatable portion is adjusted at a proper value. In this way, each inflatable portion of the airbag is deployed and inflated at a suitable pressure according to the impact resistance of an occupant's side. Consequently, each of the lumbar region and the thorax of the occupant can be effectively protected from impact.

According to a side airbag apparatus described in Japanese Laid-Open Patent Publication No. 2004-262261, a partition portion is provided in an upper air chamber. A tubular air chamber that is curved to have a semi-annular shape is formed in the upper air chamber. According to this side airbag apparatus, the inflation gas supplied to the upper air chamber flows upward along the tubular air chamber, and subsequently flows downward. Therefore, the upper air chamber is sequentially deployed and inflated along an arm, a shoulder, and a temporal of the occupant. The impact resistance of an upper part of the upper body of the occupant is not uniform. For example, the impact resistance of the shoulder is higher than that of the thorax, and is lower than that of the lumbar region. Further, impact resistance of the rear half of the thorax is higher than that of the front half.

In this respect, according to Japanese Laid-Open Patent Publication No. 2004-262261, although the upper air chamber is deployed and inflated in a determined order, the internal pressure of the upper air chamber is uniform irrespective of each part. That is, a pressure distribution of the upper air chamber is not set by taking into account differences in impact resistances of parts of the upper body of the occupant. This fact is common to vehicles that are equipped with a side airbag apparatus, not only to cars.

SUMMARY OF THE INVENTION

An objective of the present invention is to provide a side airbag apparatus that can effectively protect an occupant from impact by obtaining a pressure distribution of an inflatable portion that takes into account differences of impact resistances of parts of the occupant.

To achieve the foregoing objective and in accordance with one aspect of the present invention, a side airbag apparatus comprising an airbag is provided. The airbag has a lumbar-region-protecting inflatable portion, an upstream inflatable portion, and a downstream inflatable portion, which are inflated by inflation gas. The lumbar-region-protecting inflatable portion is deployed and inflated at a side of the lumbar region of an occupant seated on a vehicle seat. The upstream inflatable portion is adjacent to an upper side of the lumbar-region-protecting inflatable portion via a communication passage and is deployed and inflated at an internal pressure lower than that of the lumbar-region-protecting inflatable portion. The downstream inflatable portion is adjacent to a front side of the upstream inflatable portion via a planar partitioning member and is deployed and inflated by inflation gas that has passed through the upstream inflatable portion. At least one of the upstream inflatable portion and the downstream inflatable portion is a thorax-protecting inflatable portion, which is deployed and inflated at a side of the thorax of the occupant. A check valve that restricts outflow of inflation gas from the lumbar-region-protecting inflatable portion to the upstream inflatable portion is provided in the communication passage. A pressure regulation valve that has an opening and a pair of valve body elements is provided in the partitioning member. Before the occupant is restrained by the upstream inflatable portion, the valve body elements are brought into contact with each other by being pushed by inflation gas in the upstream inflatable portion, thereby restricting flow of inflation gas at the opening. When the occupant is restrained by the upstream inflatable portion, the valve body elements are flexed and separated from each other by external force applied following restraining of the occupant, thereby permitting flow of inflation gas at the opening.

BRIEF DESCRIPTION OF THE DRAWINGS

FIG. 3 is a partially cross-sectional plan view showing an airbag module that is incorporated in an accommodation portion of a seatback;

FIG. 4 is a side view showing the airbag module that has the airbag set in an uninflated and deployed state;

FIG. 10 is a partial perspective view of a vicinity of a pressure regulation valve of a partitioning member as viewed from the shoulder-protecting inflatable portion;

FIGS. 19A to 19C are schematic views showing operation of the pressure regulation valve.

DETAILED DESCRIPTION OF THE PREFERRED EMBODIMENTS

A side airbag apparatus according to one embodiment of the present invention will be described below with reference to FIGS. 1 to 19C. In description of the side airbag apparatus of the present invention, upper and lower sides, front and rear sides, and an inside and an outside are defined as shown in FIGS. 1 and 2.

Figure 1:
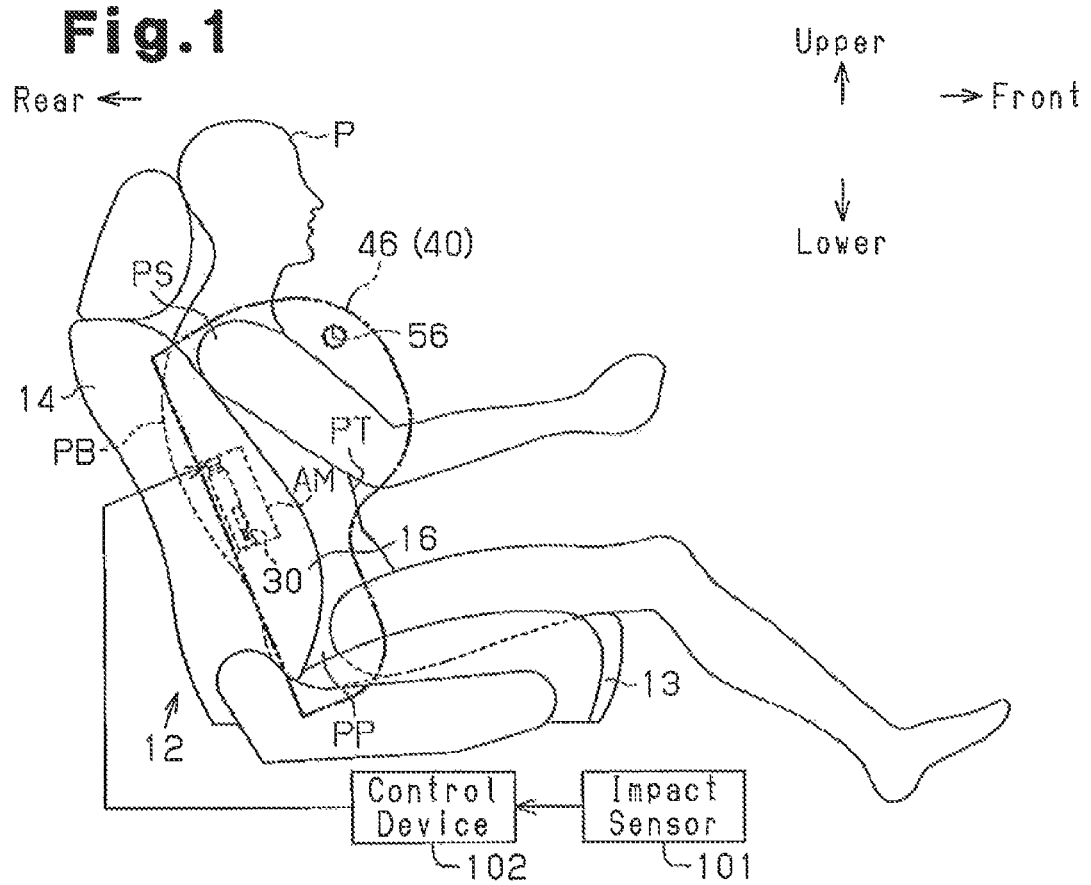
FIG. 1 is a side view of a side airbag apparatus according to one embodiment of the present invention, showing a car seat together with an occupant.
Figure 2:
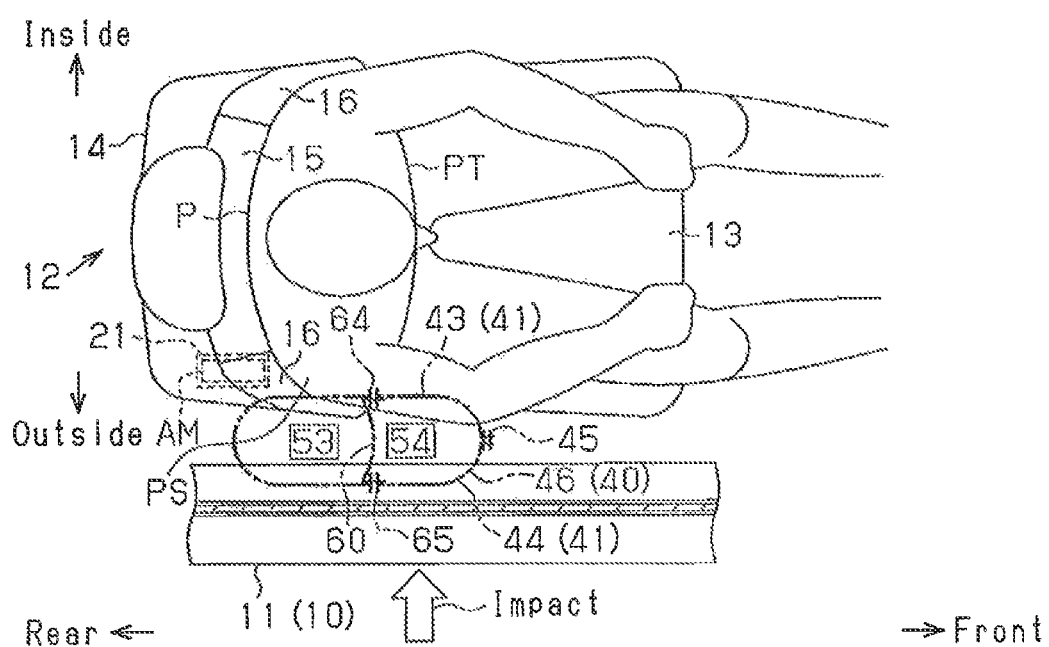
FIG. 2 is a cross-sectional plan view showing a positional relationship between the car seat, the occupant, and a body-side portion.

As shown in FIGS. 1 and 2, a car 10 has a seat 12 as a vehicle seat. The seat 12 is arranged near the inner side of a body-side portion 11. The body-side portion 11 is a member that constitutes a side part of the car 10, and includes a door, a pillar, and the like. The body-side portion 11 that corresponds to a front seat includes a front door, a center pillar (B pillar), and the like. The body-side portion 11 that corresponds to a backseat includes a rear part of a side door (rear door), a C pillar, a front part of a wheel well housing, a rear quarter, and the like.

The seat 12 includes a seat cushion 13, and a seatback 14. The seatback 14 extends upward from the rear side of the seat cushion 13. The inclination angle of the seatback 14 is adjusted by an inclination adjusting mechanism. The seat 12 is fixed to the car 10 with the seatback 14 facing forward. The width direction of the seat 12 is matched with the width direction of the car 10.

The seatback 14 includes a seatback body 15 and a pair of side support portions 16. The side support portions 16 are each provided at a side of the seatback body 15. The seatback body 15 is inclined rearward and supports the upper body of an occupant P from behind. The side support portions 16 protrude forward from the seatback body 15. The side support portions 16 restricts movement to the left and the right of the upper body of the occupant P, who sits on the seat cushion 13 and leans on the seatback body 15.

As shown in FIG. 3, a framework of the seatback 14 is formed by a seat frame. A part of the seat frame is arranged in the seatback 14, and is formed as a side frame portion 17 by bending a metal sheet. A seat pad 18 made of an elastic member such as urethane foam is arranged in front of the seat frame. A hard backboard 19 made of a synthetic resin or the like is arranged behind the seat frame. The seat pad 18 is covered with a surface covering, which is not illustrated.

An accommodation portion 21 is provided in the seat pad 18. The accommodation portion 21 is formed on the outer side of the side frame portion 17. The accommodation portion 21 is provided at an intermediate part in an up-down direction of the seatback 14, and is arranged diagonally behind the occupant P seated on the seat 12. An airbag module AM is incorporated in the accommodation portion 21.

A slit 22 extends diagonally forward from the accommodation portion 21. As shown by a line formed by a long dash alternating with two short dashes in FIG. 3, a breakable portion 23 to be broken by an airbag 40 is provided between a corner 18C of the seat pad 18 and the slit 22. The airbag module AM is incorporated in the seatback 14, and also includes an inflator assembly 30 and the airbag 40.

As described above, since the seatback 14 is used in a state of being inclined rearward, strictly speaking, an up-down direction of the airbag module AM is inclined relative to an up-down direction of the car 10. Similarly, a front-rear direction of the airbag module AM is also inclined relative to a front-rear direction of the car 10.

As shown in FIGS. 3 and 4, the inflator assembly 30 includes an inflator 31 as a gas generation source, and a retainer 32 attached to the outside of the inflator 31. A pyrotechnic type inflator is employed as the inflator 31. A gas generating agent for generating inflation gas is accommodated in the inflator 31, which is formed to have a substantially cylindrical shape. A harness, which functions as input wiring of an activation signal to the inflator 31, is connected to an upper end of the inflator 31. For the inflator 31, a hybrid-type inflator can be used, instead of the pyrotechnic type inflator using the gas generating agent. In the hybrid-type inflator, inflation gas is ejected by breaking a bulkhead to a high-pressure as cylinder filled with high-pressure gas by an explosive or the like.

The retainer 32 functions as a diffuser, and fastens the inflator 31 together with the airbag 40 to the side frame portion 17. A large part of the retainer 32 is formed in substantially a cylindrical shape, by bending a sheet material such as a metal sheet. An open end 32A is provided at a lower end of the retainer 32. The retainer 32 has a window 33 above the open end 32A. Most of the inflation gas ejected from the inflator 31 is blown downward and to the front of the retainer 32 through the open end 32A and the window 33. In this case, the inflation gas is ejected more from the open end 32A than from the window 33.

A plurality of bolts 34 is fixed to the retainer 32. The retainer 32 is attached to the side frame portion 17 with the bolts 34. That is, the bolts 34 are indirectly fixed to the inflator 31 via the retainer 32. The inflator 31 and the retainer 32, which constitutes the inflator assembly 30, may be integrated.

As shown in FIGS. 1 and 2, the airbag 40 receives supply of the inflation gas from the inflator 31 when impact is applied to the body-side portion 11 from a side of the seat 12 during running of the car 10. Accordingly, the airbag 40 projects forward from the seatback 14 with a part of the airbag 40 remaining in the seatback 14. The airbag 40 is deployed and inflated between the upper body of the occupant P and the body-side portion 11. As a result, many portions of the upper body of the occupant P are restrained by the airbag 40 and are protected from the impact.

Figure 7:
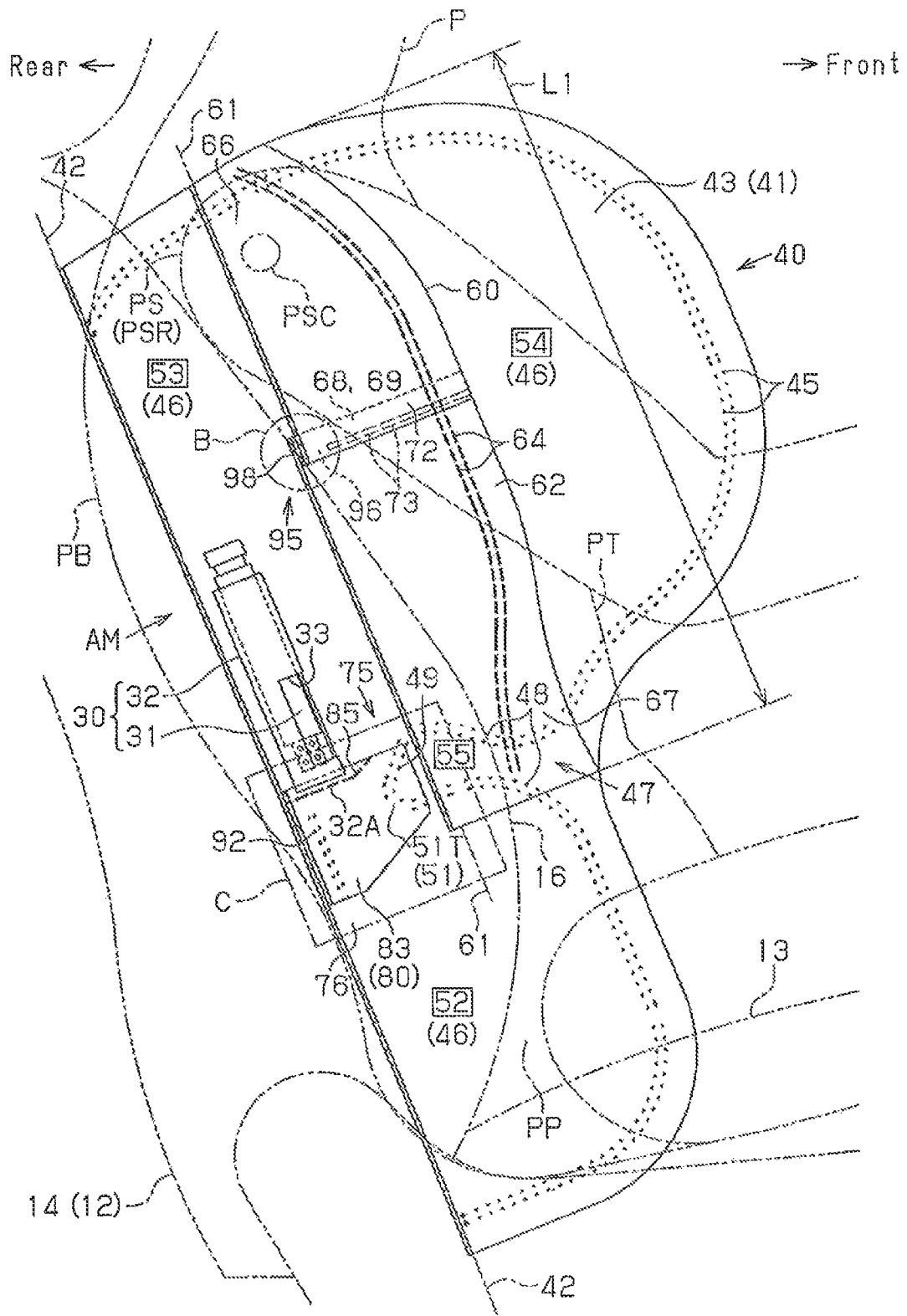
FIG. 7 is a partially cross-sectional side view of the airbag in the uninflated and deployed state as viewed from the inside, together with the car seat and the occupant.

FIG. 4 shows the airbag module AM in an uninflated and deployed state, in which the airbag 40 is deployed in a flat shape without being filled with the inflation gas. As shown in FIGS. 4 and 7, the airbag 40 is formed in a bag shape by folding a fabric 41 in half along a center folding line 42 and by joining the folded parts. The fabric 41 is referred to as a base fabric, a panel fabric, and the like. To discriminate between the inside and the outside of the airbag 40, an inside portion of the airbag 40 will be referred to as a fabric portion 43, and an outside portion of the airbag 40 will be referred to as a fabric portion 44.

In the present embodiment, the fabric 41 is folded in half with the folding line 42 arranged at the rear end of the airbag 40. However, the fabric 41 may be folded in half with the folding line 42 arranged at the front end, the upper end, or the lower end of the airbag 40. Alternatively, the airbag 40 may be formed by two fabrics divided along the folding line 42. In this case, the airbag 40 is formed in a bag shape by joining two overlapped fabrics. Further, the airbag 40 may be formed with three or more fabrics.

The shapes of the fabric portions 43, 44 have a symmetrical relationship with respect to the folding line 42. The shapes and sizes of the fabric portions 43, 44 are set such that the airbag 40 covers from the lumbar region PP to the thorax PT and a shoulder PS of the occupant P seated on the seat 12 when the airbag 40 is deployed and inflated. A material having high strength and flexibility is used for the fabric portions 43, 44. For example, a woven fabric and the like made of polyester threads or polyamide threads is suitable. Peripheral portions of the fabric portions 43, 44 are connected along a peripheral joint part 45. At the peripheral joint part 45, all portions excluding the vicinity of the folding line 42 in the peripheral parts of the fabric portions 43, 44 are sewn. This configuration is applied to external joint parts 64, 65 and internal joint parts 73, which are described below.

In FIGS. 4, 7, 8, 10, 11, and 14 to 18, a broken line formed by intermittently arranging a thick line of a constant length expresses a state of a sewing thread in an outer portion of the fabric portions 43, 44. On the other hand, a broken line formed by arranging dots at a constant distance expresses a state of a sewing thread between the fabric portions 43 and 44. That is, in the latter case, the broken line expresses a cross-sectional structure of a sewn part.

As shown in FIGS. 4 and 7, the airbag 40 is deployed and inflated at a side of the upper body of the occupant P when the inflation gas is supplied to a space between the fabric portions 43 and 44 surrounded by the peripheral joint part 45. The space surrounded by the peripheral joint part 45 is formed as an inflatable portion 46, which protects the upper body of the occupant P by restraining the upper body. The peripheral joint part 45 may be an adhesion part using an adhesive agent other than the sewn part using sewing threads. This configuration is similarly applied to the external joint pars 64, 65 and the internal joint parts 73, which will be described below.

A part of the peripheral joint part 45 is structured by a partition joint part 47. The inflatable portion 46 is partitioned into upper and lower portions by the partition joint part 47. The partition joint part 47 includes a pair of extensions 48, and a connecting part 49 that connects between rear ends of the extensions 48. The extensions 48 extend rearward from front ends of the fabric portions 43, 44 while being separated from each other. A protrusion 51, which protrudes rearward, is provided in the connecting part 49.

A portion below the partition joint part 47 of the inflatable portion 46 is a lumbar-region-protecting inflatable portion 52. The lumbar-region-protecting inflatable portion 52 restrains and protects the lumbar region PP of the occupant P as an adult having a standard body size, by being deployed and inflated at a side of a rear part of the lumbar region PP. A portion above the partition joint part 47 of the inflatable portion 46 is partitioned into front and rear two portions by a flat partitioning member 60. The partitioning member 60 has a configuration similar to that of a tether.

Figure 5:
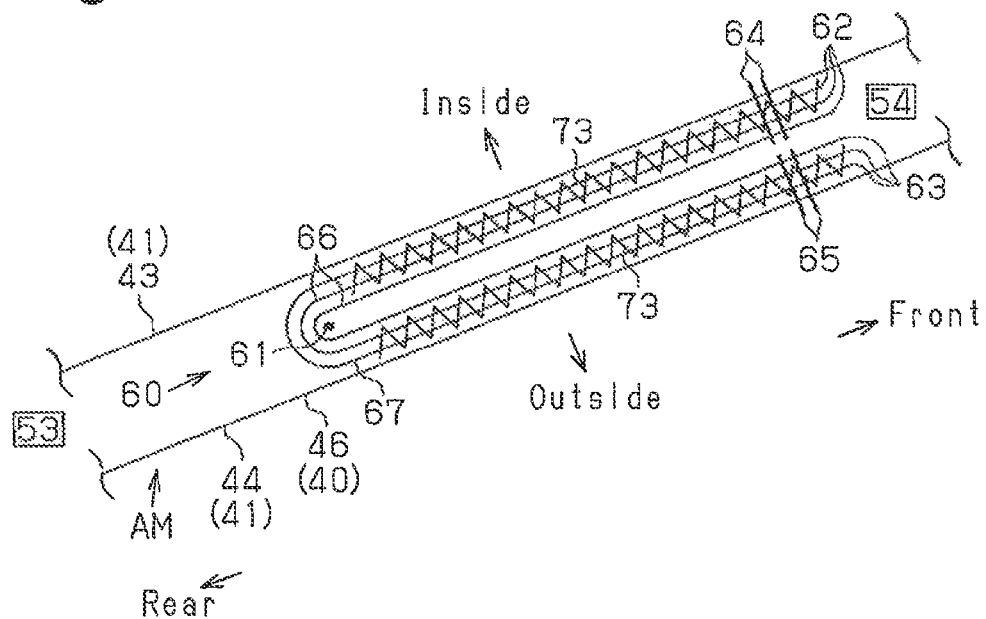
FIG. 5 is a cross-sectional view taken along line 5-5 in FIG. 4.

As shown in FIGS. 5 and 7, when the airbag 40 is in the uninflated and deployed state, the partitioning member 60 is kept folded in half along a folding line 61 to bring opposite ends 62, 63 close to each other. In the partitioning member 60, which is folded in half, the folding line 61 is arranged upstream from the opposite ends 62, 63 in the flow direction of the inflation gas G. The folding line 61 is arranged near the inflator assembly 30 in the inflatable portion 46.

Figure 8:
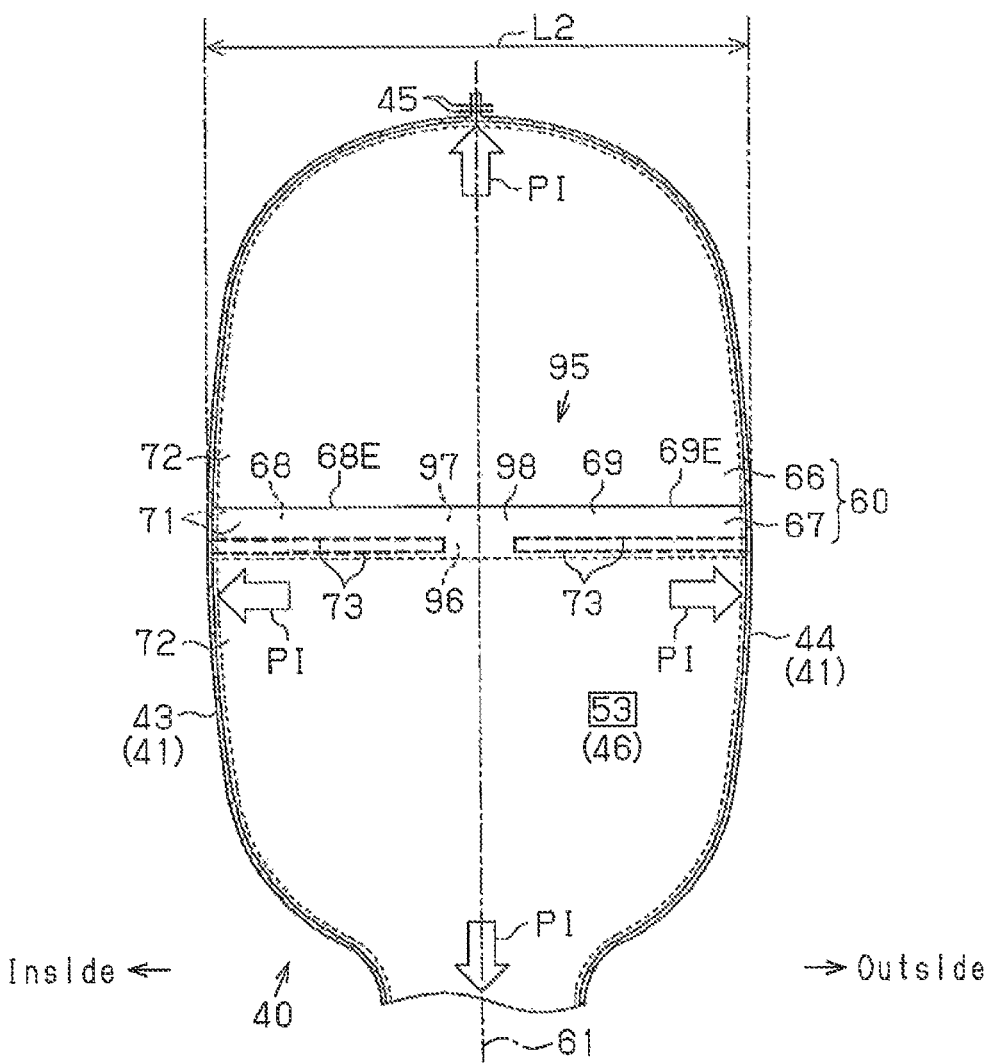
FIG. 8 is a cross-sectional view of the airbag, which is deployed and inflated, as viewed from a shoulder-protecting inflatable portion.

As shown in FIGS. 7 and 8, when the inflatable portion 46 is in a strained state due to deployment and inflation, a longitudinal-direction length L1 of the partitioning member 60 along the folding line 61 is greater than a transverse-direction length L2 that is orthogonal to the folding line 61. As shown in FIGS. 5 and 10, the end 62 of the partitioning member 60 is connected to the fabric portion 43 by the external joint part 64, and both ends 63 of the partitioning member 60 are connected to the fabric portion 44 by the external joint part 65.

In this way, the partitioning member 60 is bridged between the fabric portion 43 and the fabric portion 44. As shown in FIGS. 5 and 7, the partitioning member 60 is kept folded in half during the uninflated and deployed state of the airbag 40. The partitioning member 60 is strained in the width direction of the seat 12 at the deployed inflated state of the inflatable portion 46, and limits the thickness in the direction of the inflatable portion 46.

As shown in FIGS. 4 and 7, both ends of the partitioning member 60, which is folded in half, are connected to the airbag 40. An upper end and a lower end of the partitioning member 60 are connected to an upper end and a lower end of the fabric portions 43, 44 by the peripheral joint part 45.

The partitioning member 60 is arranged near a boundary portion between a rear half and a front half of the upper body of the occupant P when the portion above the partition joint part 47 in the inflatable portion 46 is deployed and inflated. The portion above the partition joint part 47 and also rearward of the partitioning member 60 is formed as a shoulder-protecting inflatable portion 53, which is an upstream inflatable portion. Further, the portion above the partition joint part 47 and also at a front side of the partitioning member 60 is formed as a thorax-protecting inflatable portion 54, which is a downstream inflatable portion. The shoulder-protecting inflatable portion 53 is deployed and inflated at a side of a region that includes at least a rear end PSR and a center PSC of the shoulder PS of the occupant P, and restrains and protects the shoulder PS. Further, the thorax-protecting inflatable portion 54 is deployed and inflated at a side of the thorax PT, and restrains and protects the thorax PT.

As shown in FIG. 4, a vent hole 56 for inflation gas is provided in the fabric portion 44, which constitutes the thorax-protecting inflatable portion 54. The vent hole 56 is arranged separately from the partitioning member 60. The shoulder-protecting inflatable portion 53 is projected to the outside of the accommodation portion 21 by breaking the breakable portion 23 of the seatback 14, in a process of deployment and inflation. On the other hand, the lumbarregion-protecting inflatable portion 52 is deployed and inflated inside the seatback 14. The airbag 40 in FIGS. 1 and 7 is in the uninflated and deployed state, and is in a state of having the lumbar-region-protecting inflatable portion 52 projected forward from the seatback 14.

Figure 11:
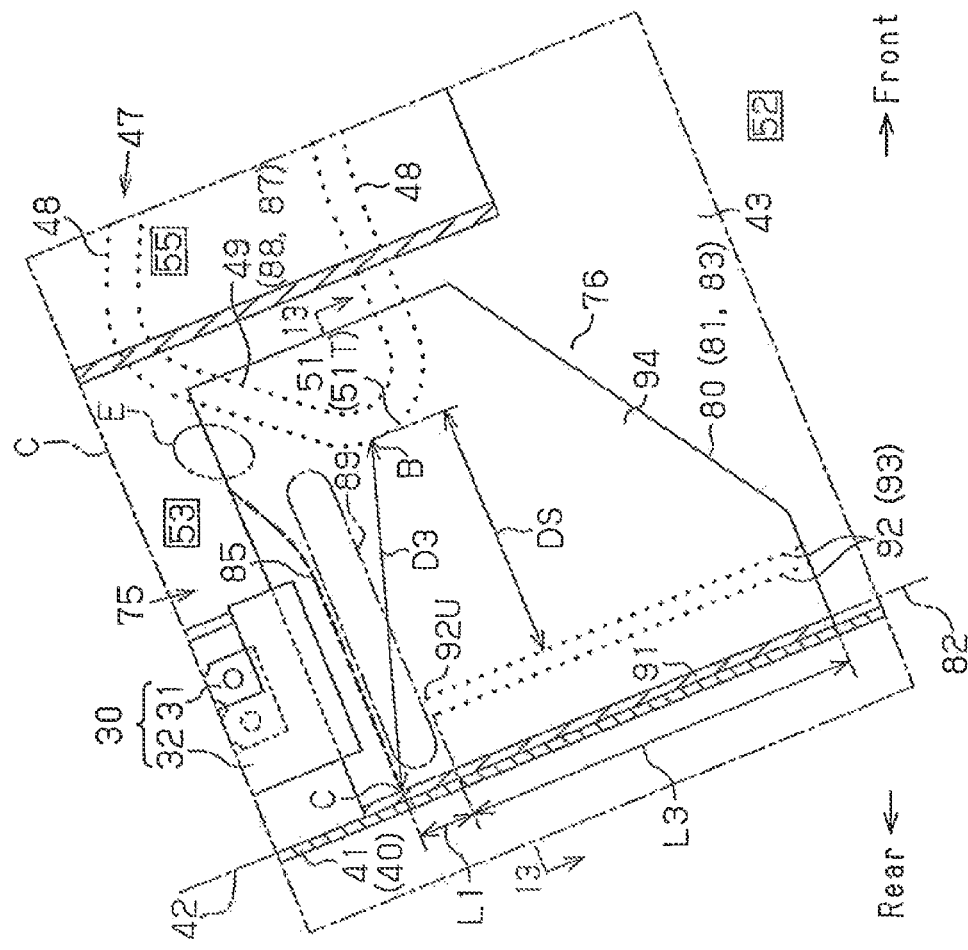
FIG. 11 is an enlarged partially cross-sectional side view section C in FIG. 7.
Figure 13:
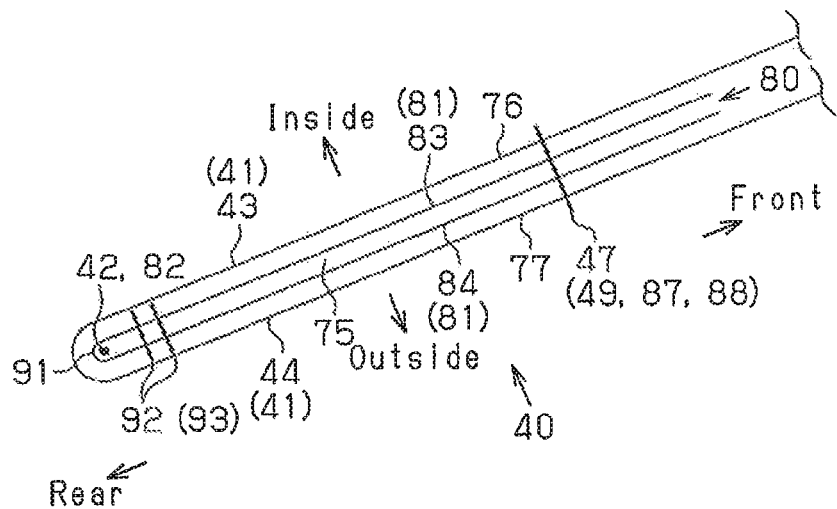
FIG. 13 is a partial cross-sectional view taken along line 13-13 in FIG. 11.

As shown in FIGS. 8 and 10, the partitioning member 60 is formed by two members 66, 67 laid out along the folding line 61. The members 66, 67 are formed in a sheet shape by using a material similar to the fabric portions 43, 44. An edge 68E of the member 66 and an edge 69S of the member 67 are overlapped to have a band shape. A boundary portion between an overlapping portion 71 of the members 66, 67 and a non-overlapping portion 72 other than the overlapping portion 71 is coupled by the internal joint parts 73. The internal joint parts 73 extend in a direction orthogonal to the folding line 61. The boundary portions are separated from the edges 68E, 69E by a constant distance, As shown in FIGS. 7 and 11, the connecting part 49 of the partition joint part 47 is arranged to the front separately from the folding line 42 of the airbag 40. As shown in FIGS. 11 and 13, a space surrounded by a rear part of the fabric portion 43, a rear part of the fabric portion 44, the folding line 42, and the connecting part 49 is a communication passage 75, which connects the Lumbar-region-protecting inflatable portion 52 and the shoulder-protecting inflatable portion 53 to each other. A portion that constitutes an inner wall of the communication passage 75 in the rear part of the fabric portion 43 is a first communication wall 76. A portion that constitutes an outer wall of the communication passage 75 in the fabric portion 44 is a second communication wall 77. The first and second communication walls 76, 77 are overlapped in a flat state before deployment and inflation of the inflatable portion 46.

In the communication passage 75, the distance between the folding line 42 and the connecting part 49 is narrowest at a distal end 51T of the protrusion 51. A portion between the fabric portions 43 and 44 surrounded by the upper and lower extensions 48 and the connecting part 49 of the partition joint part 47 is a non-inflatable portion 55, which is not deployed or inflated by the inflation gas.

Figure 12:
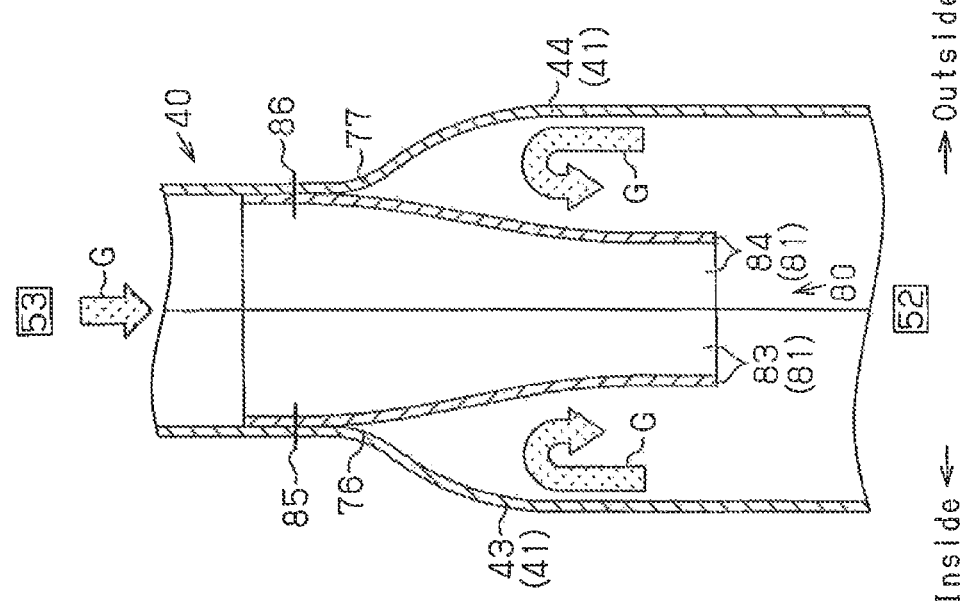
FIG. 12 is a partial cross-sectional view of a check valve in an initial period of deployment and inflation of the inflatable portion.

As shown in FIG. 7, the inflator assembly 30 is located near the communication passage 75 in an inclined posture such that a front side is lowered. A lower end of the inflator assembly 30 is arranged near a rear part of the connecting part 49. Therefore, a large part of the inflator assembly 30 is positioned above the connecting part 49. Further, as shown in FIG. 3, the bolts 34 of the retainer 32 extend through the fabric portion 43. Accordingly, the position of the inflator assembly 30 is determined relative to the airbag 40. Further, as shown in FIGS. 11 to 13, a check valve 80 is provided in the communication passage 75. The check valve 80 restricts outflow of the inflation gas G from the lumbar-region-protecting inflatable portion 52 to the thorax-protecting inflatable portion 54.

The check valve 80 is formed by a single fabric 81. The fabric 81 is arranged to cover the fabric 41 and also containing the folding line 42 of the fabric 41. The fabric 81 is folded in half along folding lines 42, 82 together with the fabric 41 in a state of having the folding line 82 at the center matched with the folding line 42 of the fabric 41. To discriminate between the inside and the outside of the fabric 81, an inside portion of the fabric 81 is referred to as a first valve body element 83, and an outside portion of the fabric 81 is referred to as a second valve body element 84.

The first valve body element 83 is coupled to the fabric portion 43 by a first outflow side joint part 85 and the partition joint part 47. The second valve body element 84 is coupled to the fabric portion 44 by a second outflow side joint part 86 and the partition joint part 47. An upper end of the first valve body element 83 is coupled to the first communication wall 76 by the first outflow side joint part 85. An upper end of the second valve body element 84 is coupled to the second communication wall 77 by the second outflow side joint part 86. A large part of the first outflow side joint part 85 and a large part of the second outflow side joint part 86 both extend in a direction substantially orthogonal to the flow direction of the inflation gas G, which flows in the communication passage 75. The upper end of the first valve body element 83 and the upper end of the second valve body element 84 are not coupled to each other.

The connecting part 49 is used to couple the valve body elements 83, 84 to the airbag 40 in the partition joint part 47. The connecting part 49 also functions as a first edge joint part 87 and a wall joint part 88. The first edge joint part 87 couples front parts of the valve body elements 83, 84 to corresponding communication walls 76, 77, respectively. The wall joint part 88 couples the communication walls 76, 77 above or near the first edge joint part 87 to each other. That is, the connecting part 49 couples the valve body elements 83, 84 to the corresponding communication walls 76, 77, respectively. The partition joint part 47 is formed by sewing the airbag 40 and the check valve 80.

The valve body elements 83, 84 each have a flexible part 89 near the outflow side joint parts 85, 86. The flexible part 89 is a portion that is softer than other portions and is easily flexed toward a shoulder-protecting inflatable portion 53 by pressure of the inflation gas G. As indicated by a line formed by a long dash alternating with one short dash in FIG. 11, the flexible part 89 is a region from the outflow side joint parts 85, 86 to a position separated by the length L1 downward from the outflow side joint parts 85, 86.

Rear parts of the valve body elements 83, 84 are coupled to each other by a second edge joint part 91. The second edge joint part 91 extends in the flow direction of the inflation gas G that flows in the communication passage 75. In the present embodiment, the folding line 82 of the fabric 81 and a portion near this line are the second edge joint part 91. Further, the rear parts of the valve body elements 83, 84 have a less-flexible part 92 at a position separated to the front from the folding line 82. The less-flexible part 92 extends to the lumbar-region-protecting inflatable portion 52, with a start point at a position separated by the length L1 from the outflow side joint parts 85, 86 beyond the flexible part 89. The less-flexible part 92 is formed by sewing the valve body elements 83, 84 in one row or a plurality of rows with sewing threads. The less-flexible part 92 is harder than the flexible part 89, and is not easily flexed. Further, the less-flexible part 92 is harder and more difficult to be flexed than the outflow side joint parts 85, 86, the first edge joint part 87, and the wall joint part 88.

The less-flexible part 92 also functions as an auxiliary joint part 93. The auxiliary joint part 93 couples the first valve body element 83 and the second valve body element 84 to each other near the second edge joint part 91. The auxiliary joint part 93 extends to the lumbar-region-protecting inflatable portion 52, with a start point at a position separated from the outflow side joint parts 85, 86 beyond the flexible part 89.

As describe above, in the communication passage 75, the distance between the folding line 42 and the connecting part 49 of the airbag 40 is narrowest at the distal end 51T of the protrusion 51. Therefore, the distance between the first edge joint part 87 and the less-flexible part 92 is smallest at the distal end 51T of the protrusion 51.

The less-flexible part 92 limits opening between the upper ends of the communication walls 76, 77, and opening between the upper ends of the valve body elements 83, 84.

The degree of the limitation is increased when an upper end 92U of the less-flexible part 92 is nearer to the outflow side joint parts 85, 86, or when the less-flexible part 92 is nearer to the distal end 51T of the protrusion 51. Accordingly, the position of the upper end 92U of the less-flexible part 92 is set so as not to greatly interrupt the opening between the communication walls 76, 77 and the opening between the valve body elements 83, 84.

Figure 14:
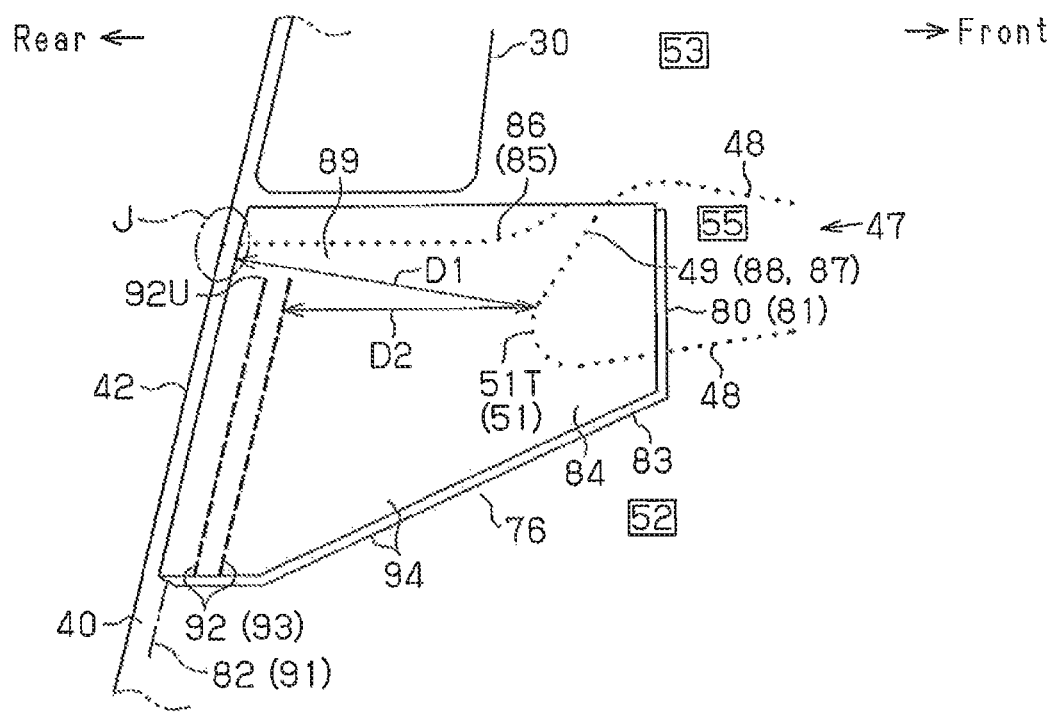
FIG. 14 is a schematic view of the check valve before inflation gas is supplied.

As shown in FIG. 14, the less-flexible part 92 is provided at a position separated to the front from the folding line 82 of the fabric 81. Therefore, the distance D1 between the folding line 82 and the wail joint part 88 is greater than the distance D2 between the less-flexible part 92 and the wall joint part 88. When the inflation gas flows between the valve body elements 83 and 84, the check valve 80 is inflated cylindrically. At this time, a region between the less-flexible part 92 and the wail joint part 88 is inflated cylindrically in an internal diameter smaller than that of the flexible part 89 as a region between the second edge joint part 91 and the wall joint part 88.

As shown in FIG. 11, the length of the less-flexible part 92 is indicated as L3, and the position where the distance from the less-flexible part 92 in the wall joint part 88 becomes narrowest is indicated as B. The position B is matched with the distal end 51T of the protrusion 51. Further, the distance between the position B and an end C of the outflow side joint parts 85, 86 is indicated as D3. In the present embodiment, the relationship of L3>D3 is satisfied.

An inclined part 94, which is inclined to become higher toward the front end, is provided at a lower part of the valve body elements 83, 84. In the inclined part 94, the valve body elements 83, 84 are not coupled. An upper end of the first valve body element 83 is coupled to the first communication wall 76, and an upper end of the second valve body element 84 is coupled to the second communication wall 77. The upper ends of the first and second valve body elements 83, 84 are not coupled. Therefore, at a supply time of the inflation gas, the check valve 80 is opened at the upper end of the inclined part 94, and is inflated cylindrically.

As shown in FIG. 12, since the first valve body element 83 is coupled to the fabric portion 43, the inflation gas G does not flow through between the first valve body element 83 and the fabric portion 43. Similarly, since the second valve body element 84 is coupled to the fabric portion 44, the inflation gas G does not flow through between the second valve body element 84 and the fabric portion 44. Since the inflation gas G flows between the valve body elements 83 and 84, the inflation gas G can flow between the lumbar-region-protecting inflatable portion 52 and the shoulder-protecting inflatable portion 53.

In FIG. 11, a position F between the first valve body element 83 and the fabric portion 43 and also sandwiched by the first outflow side joint part 85 and the connecting part 49 can become a flow passage of the inflation gas. However, when the shoulder-protecting inflatable portion 53 is inflated, the first valve body element 83 is adhered to the fabric portion 43, and therefore, the inflation gas flows little to the position E. The inflation gas also flows little to a position between the second valve body element 84 and the fabric portion 44 and also sandwiched by the second outflow side joint part 86 and the connecting part 49. Therefore, the outflow side joint parts 85, 86 and the connecting part 49 can be sewn to cross each other.

As shown in FIG. 11, the upper ends of the valve body elements 83, 84 are arranged to face the shoulder-protecting inflatable portion 53 behind the partition joint part 47. Further, the inclined part 94 of the valve body elements 83, 84 is arranged to face the lumbar-region-protecting inflatable portion 52 behind the partition joint part 47. The inflator assembly 30 is fitted in a state of having a lower end of the retainer 32 inserted into the check valve 80.

Figure 9:
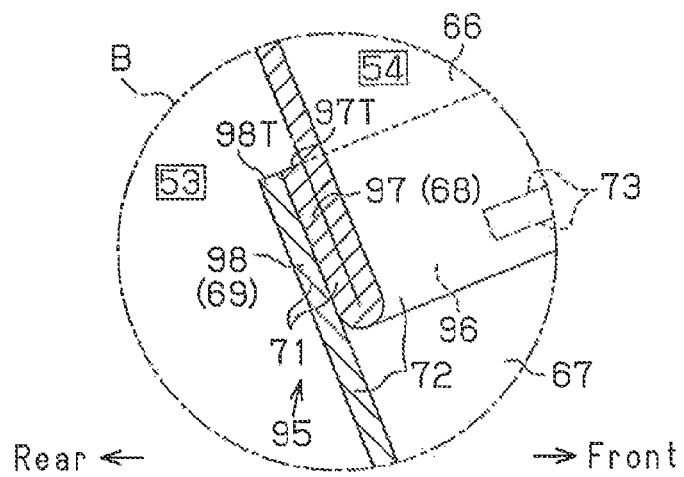
FIG. 9 is an enlarged partially cross-sectional side view of section F in FIG. 7.

As shown in FIGS. 8 to 10, a pressure regulation valve 95 is provided at a center of the partitioning member 60. The pressure regulation valve 95 is closed in an initial period of a supply period of the inflation gas. At this time, the pressure regulation valve 95 restricts flow of the inflation gas from the shoulder-protecting inflatable portion 53 to the thorax-protecting inflatable portion 54. The pressure regulation valve 95 is opened by external force applied following restraining of the occupant, from the middle of the supply period of the inflation gas. As a result, the restriction of the flow of inflation gas as described above is cancelled.

The internal joint parts 73 are omitted near the folding line 61 of the partitioning member 60. The internal joint parts 73 are omitted near the folding line 61 at a boundary portion between the overlapping portions 71 and the non-overlapping portion 72. An internal opening 96 made of a slit for connecting the shoulder-protecting inflatable portion 53 and the thorax-protecting inflatable portion 54 with each other is configured by the section at which the internal joint parts 73 are omitted. The internal opening 96 corresponds to an opening described in claims. A transverse direction, in which the internal opening 96 extends, is the same as a direction in which impact is applied to the car 10.

A portion corresponding to the internal opening 96 of the overlapping portion 71 constitutes a pair of valve body elements 97, 98. A portion between the internal opening 96 and the edge 68E is configured as the valve body element 97, and a portion between the internal opening 96 and the edge 69E is configured as the valve body element 98. As shown in FIG. 19B, when a distal end 97T of the valve body element 97 and a distal end 98T of the valve body element 98 are in contact, the pressure regulation valve 95 is closed, and therefore, flow of the inflation gas between the valve body elements 97 and 98 is restricted. On the other hand, as shown in FIG. 19C, when the internal opening 96 is opened and when the valve body element 97 is separated from the valve body element 98, the pressure regulation valve 95 is opened, and therefore, flow of the inflation gas G between the valve body elements 97 and 98 becomes possible.

The overlapping portions 71 are arranged in the shoulder-protecting inflatable portion 53 before deployment and inflation of the inflatable portion 46. Then, the overlapping portion 71 is folded upward at the boundary portion with the non-overlapping portion 72, and are overlapped with the non-overlapping portion 72. As shown in FIGS. 5 and 7, both ends of the overlapping portions 71 are coupled to corresponding fabric portions 43, 44 and the non-overlapping portion 72 of the partitioning member 60 by the external joint parts 64, 65.

As shown in FIG. 3, the airbag module AM is formed in a compact accommodation form in a state of having the airbag 40 folded. By this arrangement, the airbag module AM can be accommodated in the accommodation portion 21 of a limited space in the seatback 14. Further, in the airbag module AM, the bolts 34, which extend from the retainer 32 and through the airbag 40, are inserted into the side frame portion 17 and are screwed into nuts 35. In this way, the inflator assembly 30 is fixed to the side frame portion 17 together with the airbag 40. The inflator assembly 30 may also be fixed to the side frame portion 17 by a member other than the bolts 34 and the nuts 35.

As shown in FIG. 1, the side airbag apparatus includes an impact sensor 101 and a control device 102. The impact sensor 101 is formed by an acceleration sensor, and is fixed to the body-side portion 11. The impact sensor 101 detects impact applied from a side to the body-side portion 11. The control device 102 controls operation of the inflator 31 based on a detection signal from the impact sensor 101. The car 10 is equipped with a seatbelt apparatus (not shown) to restrain the occupant P seated on the seat 12.

Next, operation of the side airbag apparatus will be described with reference to FIGS. 14 to 18.

In FIGS. 14 to 18, the partition joint part 47 is shown by a broken line. Although the folding line 42 of the airbag 40 and the folding line 82 of the check valve 80 are shown with a distance as shown by a frame J of a line formed a long dash alternating with one short dash represented, the folding lines 42, 82 are actually matched. Therefore, the inflation gas G does not flow between the rear end of the airbag 40 and the rear end of the check valve 80.

Unless impact is applied from a side to the body-side portion 11, an activation signal for activating the inflator 31 is not output from the control device 102, and the inflation gas is not supplied to the inflatable portion 46 from the inflator 31. Therefore, as shown in FIG. 3, the airbag 40 is kept accommodated in the accommodation portion 21 in the accommodation form. At this time, the fabric portions 43, 44, which constitute the airbag 40, are close to each other. As shown in FIG. 5, the partitioning member 60 is kept folded in half by keeping the folding line 61 arranged at the upstream side of the opposite ends 62, 63. As shown in FIG. 9, the valve body elements 97, 98 are kept overlapped in the shoulder-protecting inflatable portion 53. As shown in FIG. 14, the first and second valve body elements 83, 84 constituting the check valve 80 are also kept overlapped.

During running of the car 10, when impact equal to or greater than a predetermined value is applied to the body-side portion 11 by side collision or the like, the impact sensor 101 detects the impact. Then, based on its detection signal, as shown in FIGS. 1 and 2, an activation signal for operating the inflator 31 is output from the control device 102. Following this activation signal, as shown in FIG. 7, a gas generating agent in the inflator 31 generates inflation gas of a high temperature and a high pressure, and the inflation gas is ejected in a radial direction of the inflator 31. Further, some of the inflation gas flows to the shoulder-protecting inflatable portion 53 through the window 33 of the retainer 32. In this way, inflation of the shoulder-protecting inflatable portion 53 is started.

Figure 15:
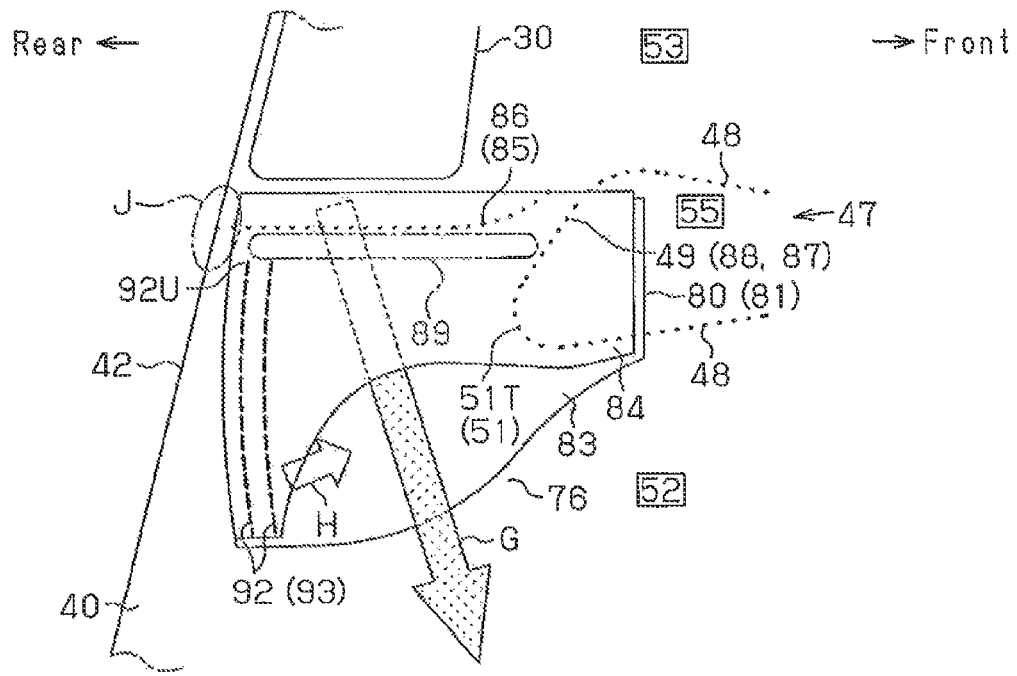
FIG. 15 is a schematic view of the check valve when the inflation as is being supplied.

Further, inflation gas flows more to the check valve 80 from the open end 32A at a lower side of the retainer 32 than to the shoulder-protecting inflatable portion 53. During a period while the inflation gas from the inflator 31 is being supplied to the check valve 80, as shown in FIG. 15, force that acts to cause the first and second valve body elements 83, 84 to have a cylindrical shape is generated in the first valve body element 83 and the second valve body element 84. This is because the upper end of the first valve body element 83 is coupled to the first communication wall 76, and because the upper end of the second valve body element 84 is coupled to the second communication wall 77. This is also because the front parts of the valve body elements 83, 84 are coupled to the corresponding communication walls 76, 77 by the first edge joint part 87. Further, this is also because the rear parts of the valve body elements 83, 84 are coupled by the auxiliary joint parts 93.

in this case, the internal diameter of the cylinder formed by the first and second valve body elements 83, 84 varies between the flexible part 89 and portions below the flexible part 89. In the check valve 80, the auxiliary joint part 93 is provided at a position separated to the front from the second edge joint part 91 of the fabric 81. As a result, as shown in FIG. 14, the distance D1 between the second edge joint part 91 and the first edge joint part 87 is greater than the distance D2 between the less-flexible part 92 and the first edge joint part 87. Therefore, a portion below the flexible part 89 of the valve body elements 83, 84 is inflated cylindrically in an internal diameter smaller than that of the flexible part 89.

However, while the front parts of the valve body elements 83, 84 are coupled to the corresponding communication walls 76, 77, the rear parts of the valve body elements 83, 84 are coupled by only the auxiliary joint part 93 and are not coupled to the corresponding communication walls 76, 77. Therefore, the front parts of the valve body elements 83, 84 cannot move relative to the communication walls 76, 77, but the rear parts of the valve body elements 83, 84 can move relative to the communication walls 76, 77. Further, the less-flexible part 92 of the valve body elements 83, 84 is rigid and is difficult to be flexed, but the flexible part 89 is soft and flexible.

Therefore, the valve body elements 83, 84 are cylindrically inflated in a large internal diameter in the flexible part 89, and are going to be cylindrically inflated in a small internal diameter at a portion below the flexible part 89. Then, the flexible part 89 is pulled toward the shoulder-protecting inflatable portion 53 and flexed. Following this, as indicated by arrow H in FIG. 15, the portion below the flexible part 89 of the valve body elements 83, 84 is pulled toward the outflow side joint parts 85, 86 and the wall joint part 88, using a portion (F in FIG. 16) near the upper end 92U of the less-flexible part 92 as a fulcrum. Accordingly, the less-flexible part 92 is inclined such that the lower side is positioned forward. Further, wrinkles are easily generated at a flexible portion between the wall joint part 88 and the less-flexible part 92.

The inflation gas G passes through the check valve 80, which is cylindrically inflated, then enters the lumbar-region-protecting inflatable portion 52, and inflates the lumbar-region-protecting inflatable portion 52. Based on a continuous supply of the inflation gas G from the inflator 31, the internal pressure of the lumbar-region-protecting inflatable portion 52 increases. The lumbar-region-protecting inflatable portion 52 is inflated while being deployed in an order opposite to an order of being folded inside the seatback 14. By the lumbar-region-protecting inflatable portion 52, which has a high internal pressure, lower parts of the side support portions 16 outside the seatback 14 are pressed strongly. Based on this pressing, the side support portions 16 at a periphery of the lumbar-region-protecting inflatable portion 52 are inflated forward and inward at the seat 12. Based on the inflated side support portions 16, the back part of the lumbar region PP of the occupant P is pressed strongly inward.

On the other hand, at the upper half of the inflatable portion 46, the folding line 61 of the partitioning member 60 is arranged upstream from the opposite ends 62, 63. Further, the opposite ends 62, 63 are coupled to the corresponding fabric portions 13, 44 by the external joint parts 64, 65. The upper end and the lower end of the partitioning member 60 are coupled to the fabric portions 43, 44 by the peripheral joint part 45. Therefore, after inflation of the shoulder-protecting inflatable portion 53 is started, the partitioning member 60 is pulled from the state of being folded in half, and is deformed into a curved shape. At this time, tension occurs in the longitudinal direction and in the transverse direction in the partitioning member 60. Accordingly, the partitioning member 60 is strained.

An internal pressure P1 is applied to the valve body elements 97, 98 as indicated by the arrow in FIG. 19A. The internal pressure PI is not as high as the internal pressure when restraining the occupant P by the shoulder-protecting inflatable portion 53 or the internal pressure of the lumbar-region-protecting inflatable portion 52. At this time, the whole surfaces of the valve body elements 97, 98 closely contact each other, and flow of the inflation gas between the valve body elements 97 and 98 is restricted. Further, as shown in FIG. 10, the overlapping portion 71 is pressed to the non-overlapping portion 72 by the internal pressure PI. Accordingly, the valve body elements 97, 93 are closed.

As shown in FIGS. 7 and 8, the partitioning member 60 is formed vertically long (L1>L2). Therefore, higher tension is easily applied in the transverse direction than in the longitudinal direction in the partitioning member 60. The internal opening 96 extends in the transverse direction in which tension can be easily applied. Therefore, the internal opening 96 can be easily closed. However, tension is also applied in the longitudinal direction, in the partitioning member 60. Therefore, there is a risk that the internal opening 96 is opened. Also in this case, the valve body elements 97, 98 are closed by the own distal ends 97T, 98T. This is because force that acts to open the internal opening 96 by pulling in the strained state of the partitioning member 60 is greatest in the internal opening 96, and becomes smaller at a position farther from the internal opening 96. That is, at the distal ends 97T, 98T of the valve body elements 97, 98, the force that acts to open the internal opening 96 becomes smallest.

As shown in FIG. 10, the overlapping portion 71 is folded onto the non-overlapping portion 72, and is also coupled to the fabric portions 43, 44 together with the opposite ends 62, 63. Therefore, when the shoulder-protecting inflatable portion 53 is deployed and inflated, not only high tension is applied in the transverse direction in the partitioning member 60, high tension is also applied in the transverse direction in the overlapping portion 71.

When at least a part of the valve body elements 97, 96 is in contact, the pressure regulation valve 95 is closed. Therefore, the inflation gas in the shoulder-protecting inflatable portion 53 does not flow to the thorax-protecting inflatable portion 54 through between the valve body elements 97, 98 and through the internal opening 96. That is, the inflation gas in the shoulder-protecting inflatable portion 53 does not flow to the thorax-protecting inflatable portion 54 through the internal opening 96, or flows only slightly. As a result, the inflation gas is accumulated in the shoulder-protecting inflatable portion 53, and the internal pressure of the shoulder-protecting inflatable portion 53 increases.

Figure 6:
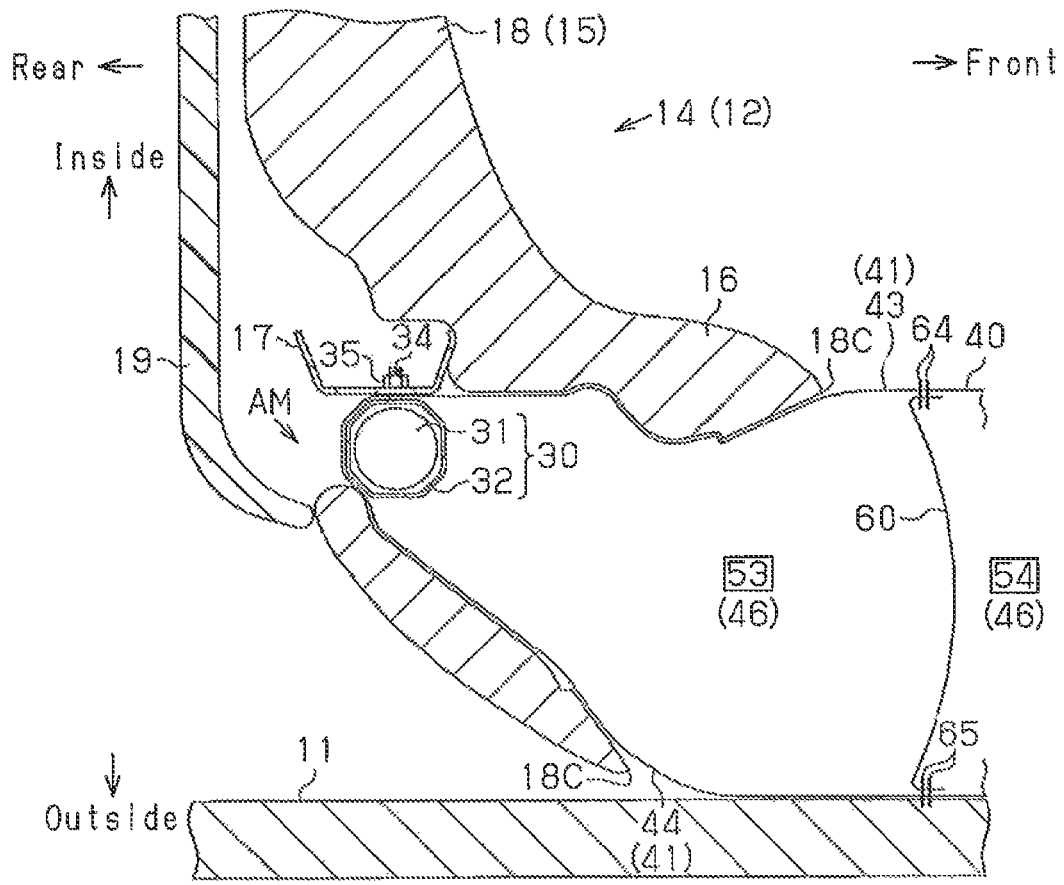
FIG. 6 is a partially cross-sectional plan view of the airbag, which is deployed and inflated after projecting out of the car seat.

In the present embodiment, the upper half of the inflatable portion 46 is partitioned into the shoulder-protecting inflatable portion 53 and the thorax-protecting inflatable portion 54 by the partitioning member 60. Therefore, the volume of the shoulder-protecting inflatable portion 53 is smaller than the volume when the upper half of the inflatable portion 46 is not partitioned. Therefore, the internal pressure of the shoulder-protecting inflatable portion 53 increases faster than when the upper half of the inflatable portion 46 is not partitioned and becomes high. Particularly, the inflation gas in the shoulder-protecting inflatable portion 53 does not flow out to the thorax-protecting inflatable portion 54 without flowing through between the valve body elements 97, 98. Therefore, an increase speed of the internal pressure of the shoulder-protecting inflatable portion 53 does not decrease because of outflow of the inflation gas. Then, the shoulder-protecting inflatable portion 53 is inflated while being deployed in an order opposite to an order of being folded. Accordingly, the seat pad 18 is pressed by the shoulder-protecting inflatable portion 53, and is broken by the breakable portion 23. As shown in FIG. 6, the shoulder-protecting inflatable portion 53 is projected forward from a broken position of the seatback 14 with a part of the shoulder-protecting inflatable portion 53 remaining in the accommodation portion 21.

Thereafter, as shown in FIG. 2, the shoulder-protecting inflatable portion 53 is deployed and inflated between the body-side portion 11 and the shoulder PS of the occupant P. The internal pressure of the shoulder-protecting inflatable portion 53 is higher than that of the thorax-protecting inflatable portion 54, and is lower than that of the lumbar-region-protecting inflatable portion 52. As shown in FIG. 7, the shoulder-protecting inflatable portion 53 is deployed and inflated in a region that includes at least the rear end PSR and the center PSC of the shoulder PS. Further, impact resistance of this region is higher than that of the thorax PT and is lower than that of the lumbar region PP. At this time point, the thorax-protecting inflatable portion 54 is not inflated, or is inflated little. Therefore, the internal pressure of the thorax-protecting inflatable portion 54 remains low.

When the body-side portion 11 enters further inside, the shoulder PS is pressed inward in the car by the shoulder-protecting inflatable portion 53, and therefore, the occupant P is restrained. The outline of the shoulder PS is not as curved inward of the vehicle toward the rear end of the vehicle as to the back PB. Therefore, the shoulder PS is easily pressed inward by the shoulder-protecting inflatable portion 53. Further, the shoulder PS is a portion protruding most outward in the upper body of the occupant P, and is closest to the body-side portion 11. Therefore, the distance between the body-side portion 11 and the upper body of the occupant. P before application of impact is smallest in the shoulder PS.

Therefore, the shoulder-protecting inflatable portion 53 can press the shoulder PS inward by a small inflation volume, as compared with a case of pressing a portion other than the shoulder PS in the upper body of the occupant P. Further, the pressing by the shoulder-protecting inflatable portion 53 is started in a short time after deployment and inflation of the shoulder-protecting inflatable portion 53 is started. Further, impact resistance against impact to the upper body of the occupant P from a side is higher in the shoulder PS than in the back PB. The shoulder PS of this high impact resistance is strongly pressed by the shoulder-protecting inflatable portion 53 of which the internal pressure is increased at an early stage.

Then, the occupant P is moved inward and restrained, by the pressing of the shoulder PS by the shoulder-protecting inflatable portion 53 and by the pressing of the lumbar region PP by the lumbar-region-protecting inflatable portion 52. Accordingly, the distance between the occupant P and the body-side portion 11 is increased. As a result, a space for deployment and inflation of the thorax-protecting inflatable portion 54 is ensured. When an area of the shoulder PS that receives pressing force from the shoulder-protecting inflatable portion 53 is larger, operation of the shoulder-protecting inflatable portion 53 that restrains the occupant P by pressing the shoulder PS becomes large. However, the above operation is sufficiently obtained by pressing a region including at least the rear end PSR and the center PSC of the shoulder PS by the shoulder-protecting inflatable portion 53. Further, when an area of the lumbar region PP that receives pressing force from the lumbar-region-protecting inflatable portion 52 is larger, operation of the lumbar-region-protecting inflatable portion 52 that restrains the occupant P by pressing the lumbar region PP becomes large. However, the above operation is sufficiently obtained by pressing at least the rear part of the lumbar region PP by the lumbar-region-protecting inflatable portion 52.

In the above-described series of process, since the shoulder-protecting inflatable portion 53 is exclusively deployed and inflated, a position where the occupant P receives pressure by the upper half of the inflatable portion 46 is only the shoulder-protecting inflatable portion 53. While the inflation gas is continuously supplied in the shoulder-protecting inflatable portion 53 in the closed state of the valve body elements 97, 98, the pressure regulation valve 95 starts being opened by external force from the body-side portion 11. At this time, from the middle of supply of the inflation gas to the upper half of the inflatable portion 46, the upper half of the inflatable portion 46 is pressed and deformed by external force following restraining of the occupant. Accordingly, the tension in the transverse direction to the partitioning member 60 decreases, and the tension in the longitudinal direction increases.

Further, following deformation of the inflatable portion 46, the internal pressure PI of the shoulder-protecting inflatable portion 53 further increases. Then, as shown in FIG. 19B, when the partitioning member 60 is pressed to the thorax-protecting inflatable portion 54 side, tension applied to the partitioning member 60 changes. Accordingly, a difference in tension between the longitudinal direction and the transverse direction becomes small, the internal opening 96 is deformed, and the valve body elements 97, 98 start moving.

On the other hand, the overlapping portion 71 is overlapped with the non-overlapping portion 72. Further both ends of the overlapping portion 71 are coupled to the fabric portions 43, 44 by the external joint parts 64, 65. Therefore, force to maintain the overlapped state acts strongly, near the external joint parts 64, 65 of the overlapping portion 71. This force becomes smaller at a position farther from the external joint parts 64, 65, and becomes smallest at the valve body elements 97, 98 at the center of the overlapping portion 71. Therefore, the overlapping portion 71 pulled in the longitudinal direction and the transverse direction is deformed at or near portions of the valve body elements 97, 98.

When the internal opening 96 is opened to some extent, at the overlapping portion 71, the valve body elements 97, 98 receive the internal pressure PI having a high pressure of the shoulder-protecting inflatable portion 53, and are pushed out from the internal opening 96 to the thorax-protecting inflatable portion 54. When the width W1 in the up-down direction of the internal opening 96 is narrow, the distal ends 97T, 98T contact each other, and the valve body elements 97, 98 are closed by the distal ends 97T, 98T. As shown in FIG. 19C, at this time, the width W1 of the internal opening 96 is narrower than a total value (2·W2) of the width W2 of each of the valve body elements 97, 98.

As shown in 19D, when the width W1 of the internal opening 96 becomes larger than the total value (2·W2), the distal ends 97T, 98T are separated, and the pressure regulation valve 95 is opened. Then, the inflation gas G in the shoulder-protecting inflatable portion 53 flows out to the thorax-protecting inflatable portion 54 through between the internal opening 96 and the valve body elements 97, 98. Accordingly, the internal pressure of the shoulder-protecting inflatable portion 53 does not increase, and stops decreasing. At this time, since the body-side portion 11 continues entering the inside, the shoulder-protecting inflatable portion 53 of the upper half of the inflatable portion 46 keeps being pressed to the occupant P.

Subsequently, the internal pressure of the thorax-protecting inflatable portion 54 increases, and the thorax-protecting inflatable portion 54 is deployed in an order opposite to an order of being folded. At this time, the thorax-protecting inflatable portion 54 is deployed and inflated at an internal pressure lower than that of the shoulder-protecting inflatable portion 53. At this time, the distance between the body-side portion 11 and the upper body of the occupant P is in a state of being increased by the shoulder-protecting inflatable portion 53 and the lumbar-region-protecting inflatable portion 52. Accordingly, the thorax-protecting inflatable portion 54 is easily deployed and inflated forward from a space between the body-side portion 11 and the occupant P.

Then, by deployment and inflation of the thorax-protecting inflatable portion 54, the upper body of the occupant P is pressed also to the thorax-protecting inflatable portion 54 of the inflatable portion 46. Accordingly, the upper body of the occupant P is restrained by the shoulder-protecting inflatable portion 53 and the thorax-protecting inflatable portion 54. The inflation gas G in surplus in the thorax-protecting inflatable portion 54 after the deployment and inflation is discharged to the outside of the airbag 40 through a vent hole 56. Accordingly, the internal pressure of the thorax-protecting inflatable portion 54 gradually decreases. In this way, the airbag 40 is located between the upper body of the occupant P and the body-side portion 11. The airbag 40 restrains the upper body of the occupant P by pressing the upper body inward. As a result, impact from the side transmitted to the occupant P through the body-side portion 11 is buffered by the inflatable portion 46, and the upper body of the occupant P is protected.

Figure 16:
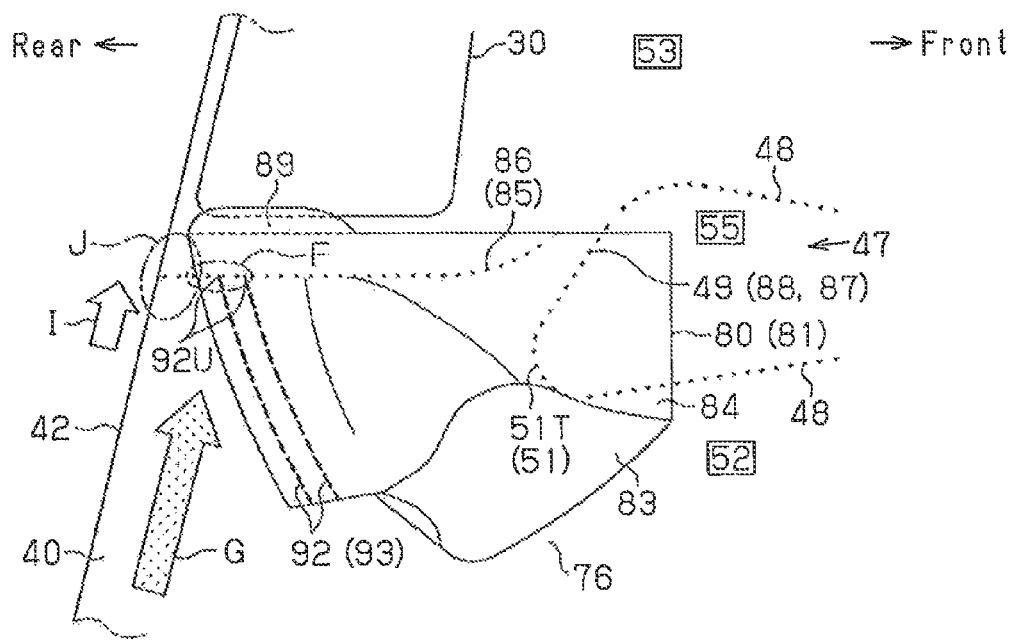
FIG. 16 is a schematic view of the check valve immediately after supply of the inflation gas is stopped.
Figure 17:
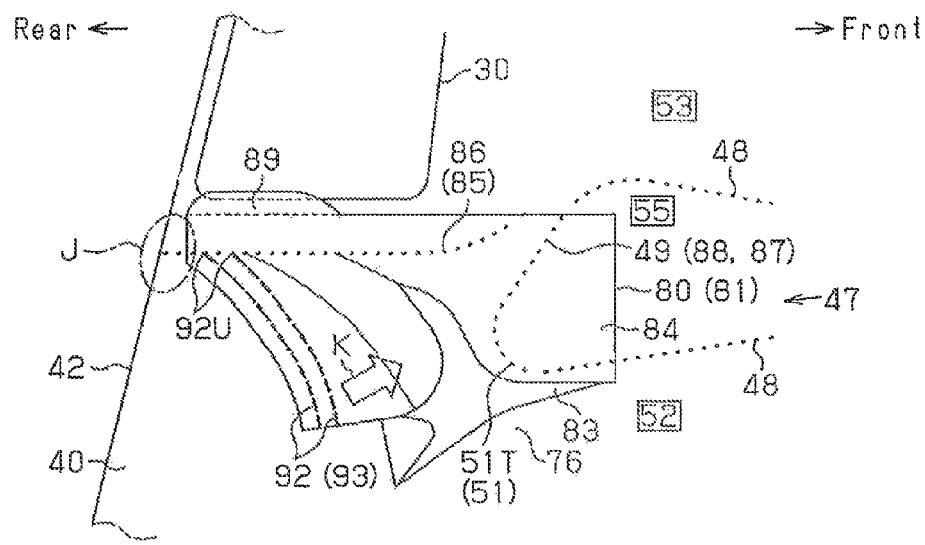
FIG. 17 is a schematic view showing a state immediately before the check valve is closed.

Thereafter, as shown in FIG. 16, when ejection of the inflation gas from the inflator 31 stops, the inflation gas G in the lumbar-region-protecting inflatable portion 52 flows to the shoulder-protecting inflatable portion 53. Then, the check valve 80 operates as follows. The flexible part 89 is pulled to the shoulder-protecting inflatable portion 53, and is flexed based on a difference of internal diameters. Then, the flexible part 89 receives, in an instant, a high pressure by the inflation gas G in the lumbar-region-protecting inflatable portion 52, and is pressed to the shoulder-protecting inflatable portion 53, As a result, the flexible part 89 is pushed up as indicated by arrow I in FIG. 16. Following this, the portion below the flexible part 89 is pulled toward the outflow side joint parts 85, 86 and the wall joint part 88.

In this case, the less-flexible part 92 is also pulled toward the outflow side joint parts 85, 86. The less-flexible part 92 turns toward the outflow side joint parts 85, 86 and the wall joint part 88, using the vicinity of the upper end U indicated by a frame F as a support point. At this time, the portion below the flexible part 89 of the valve body elements 83, 84 also receives a high pressure by the inflation gas G in the lumbar-region-protecting inflatable portion 52, in a similar manner to that of the flexible part 89. Therefore, as indicated by arrow K in FIG. 17, the portion below the flexible part 89 of the valve body elements 83, 84 is folded diagonally forward upward so as to be pushed to between the valve body elements 83, 84. Accordingly, a flow passage of the inflation gas G made of the space between the valve body elements 83, 84 becomes narrow.

Figure 18:
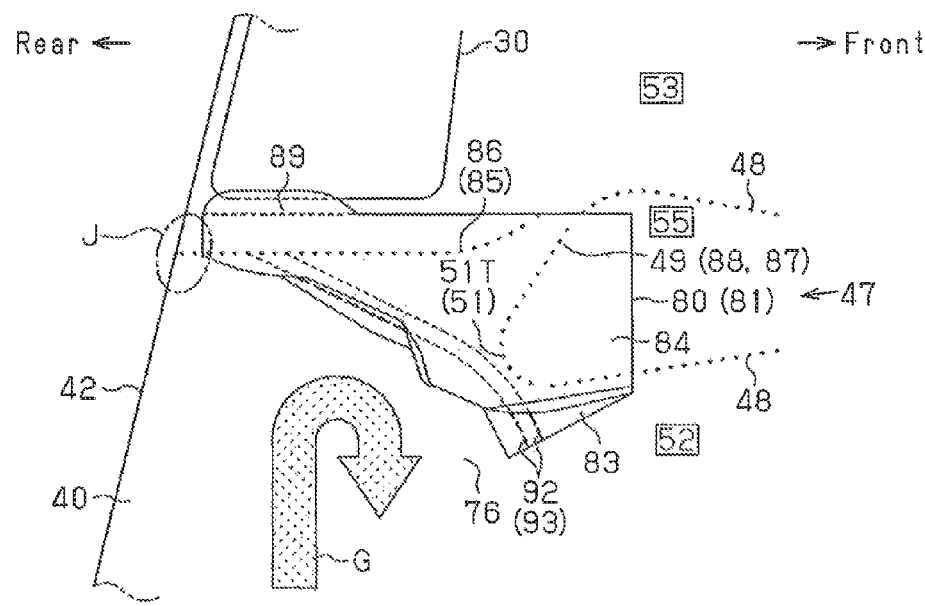
FIG. 18 is a schematic view showing a state that the check valve is completely closed.

Further, as shown in FIG. 11, the length L3 of the less-flexible part 92 is set longer than the distance D3 between the distal end 51T of the protrusion 51 and the end C of the outflow side joint parts 85, 36 (L3>D3). Accordingly, as shown in FIG. 18, the less-flexible part 92 is brought into contact with the protrusion 51 of the connecting part 49 in the middle of turning diagonally forward upward. In this way, the protrusion 51 restricts further turn of the less-flexible part 92 to the outflow side joint parts 85, 86 and the wall joint part 88. Then, the check valve 80 is closed, and the outflow of the inflation gas G in the lumbar-region-protecting inflatable portion 52 to the shoulder-protecting inflatable portion 53 is restricted. Accordingly, the internal pressure of the lumbar-region-protecting inflatable portion 52 is maintained without decreasing, at a pressure suitable for protecting the lumbar region PP.

Thereafter, the check valve 80 also permits inflow of the inflation gas G to the lumbar-region-protecting inflatable portion 52 from the shoulder-protecting inflatable portion 53, but restricts outflow of the inflation gas G from the lumbar-region-protecting inflatable portion 52 to the shoulder-protecting inflatable portion 53. Therefore, even when the internal pressure of the lumbar-region-protecting inflatable portion 52 increases because the side airbag apparatus restrains the lumbar region PP, the check valve 80 restricts outflow of the inflation gas G from the lumbar-region-protecting inflatable portion 52 to the shoulder-protecting inflatable portion 53. As a result, the internal pressure of the shoulder-protecting inflatable portion 53 does not increase due to a pressure variation in the lumbar-region-protecting inflatable portion 52 following restraining of the lumbar region PP. Particularly, since the inflation gas G does not go between the shoulder-protecting inflatable portion 53 and the lumbar-region-protecting inflatable portion 52 without through the check valve 80, the above-described function is not lost.

When the internal pressure of the lumbar-region-protecting inflatable portion 52 becomes excessively high, the less-flexible part 92 tries to move beyond the wall joint part 88. In such a case, following the move of the less-flexible part 92, the portion below the flexible part 89 of the valve body elements 83, 84 also tries to move beyond the wall joint part 88. In this case, there is a risk that the valve body elements 83, 84 are opened, and there is a risk that the inflation gas G in the lumbar-region-protecting inflatable portion 52 flows backward to the shoulder-protecting inflatable portion 53 through the check valve 80. In this respect, in the present embodiment, the lower end of the inflator assembly 30 is arranged near the outflow side joint parts 85, 86 in the shoulder-protecting inflatable portion 53. Therefore, the lower end of the inflator assembly 30 can prevent the less-flexible part 92 and the valve body elements 83, 84 from moving to the wall joint part 88 more than is necessary. As a result, it is possible to restrict moving of the less-flexible part 92 and the valve body elements 83, 84 beyond the wall joint part 88.

While a representative operation mode of the side airbag apparatus has been described above, the check valve 80 also operates in other modes in some cases. In another mode, the side airbag apparatus operates similarly to the representative mode until the flexible part 89 is pulled to the shoulder-protecting inflatable portion 53 and also until the less-flexible part 92 is pulled to the outflow side joint, parts 85, 86 and the wall joint part 88. Thereafter, the portions below the flexible part 89 of the valve body elements 83, 84 become close to each other by receiving a high pressure by the inflation gas G in the lumbar-region-protecting inflatable portion 52. Then, the portions below the flexible part 89 of the valve body elements 83, 84 are crashed while being closely adhered to the shoulder-protecting inflatable portion 53 from near the less-flexible part 92, and close the flow passage of the inflation gas G between the valve body elements 83 and 84.

As described above, according to the present embodiment, the following advantages are achieved.

(1) The airbag 40 is configured by the lumbar-region-protecting inflatable portion 52, the upstream inflatable portion and the downstream inflatable portion. Further, the airbag 40 includes the upstream inflatable portion as the shoulder-protecting inflatable portion 53, and the downstream inflatable portion as the thorax-protecting inflatable portion 54. Further, the check valve 80 for restricting the outflow of the inflation gas G from the lumbar-region-protecting inflatable portion 52 to the shoulder-protecting inflatable portion 53 is provided in the communication passage 75 between the lumbar-region-protecting inflatable portion 52 and the shoulder-protecting inflatable portion 53. Further, the pressure regulation valve 95 having the internal opening 96 and the pair of valve body elements 97, 98 is provided in the partitioning member 60 between the shoulder-protecting inflatable portion 53 and the thorax-protecting inflatable portion 54.

According to this configuration, in an initial period of deployment, and inflation of the inflatable portion 46, the lumbar-region-protecting inflatable portion 52 is deployed and inflated at a highest internal pressure at a side of the lumbar region PP, which has the highest impact resistance. Subsequently, the shoulder-protecting inflatable portion 53 is deployed and inflated at an internal pressure highest next to that of the lumbar-region-protecting inflatable portion 52, at a side of the shoulder PS, which has a high impact resistance. Further, the thorax-protecting inflatable portion 54 is deployed and inflated at an internal pressure lower than that of the shoulder-protecting inflatable portion 53, at a side of the thorax PT of lower impact resistance than that of the shoulder PS. That is, a proper pressure distribution is obtained at the inflatable portion 46, and the upper body of the occupant P is effectively protected from impact, by considering differences in impact resistance among the lumbar region PP, the shoulder PS, and the thorax PT. Further, the distance between the body-side portion 11 and the upper body of the occupant P is also increased, by moving the occupant P inward by strongly pressing the lumbar region PP and the shoulder PS. Since a space for deploying and inflating the thorax-protecting inflatable portion 54 is ensured by this, the thorax-protecting inflatable portion 54 can be reliably deployed and inflated. As a result, protection performance of the occupant P is improved.

(2) The shoulder-protecting inflatable portion 53 is deployed and inflated at a side of the region that includes at least the rear end PSR and the center PSC of the shoulder PS. Therefore, although the area of the shoulder PS that receives pressing force from the shoulder protesting inflatable portion 53 is small, the shoulder PS is pressed by the shoulder-protecting inflatable portion 53, and the occupant P can be moved inward and restrained.

(3) The lumbar-region-protecting inflatable portion 52 is deployed and inflated at the rear part of the lumbar region PP. Therefore, although the area of the lumbar region PP that receives the pressing force from the lumbar-region-protecting inflatable portion 52 is small, the lumbar region PP can be pressed by the lumbar-region-protecting inflatable portion 52, and the occupant P can be moved inward and restrained.

(4) The airbag 40 is accommodated in the accommodation portion 21 of the seat 12. Further, the lumbar-region-protecting inflatable portion 52 is deployed and inflated inside the seatback 14. Therefore, the side support portions 16 is inflated forward and inward by pressing the side support portions 16 by the lumbar-region-protecting inflatable portion 52. Accordingly, by the side support portions 16, the occupant P seated on the seat 12 is moved inward by pressing the occupant P and also can be restrained.

(5) The internal pressure of the shoulder-protecting inflatable portion 53 has a risk of receiving an influence of a change of the internal pressure of the thorax-protecting inflatable portion 54. In this respect, according to the present embodiment, the vent hole 56 is provided in the thorax-protecting inflatable portion 54. According to this configuration, based on adjustment of discharge of the inflation gas from the vent hole 56, a pressure distribution of the thorax-protecting inflatable portion 54 and the shoulder-protecting inflatable portion 53 is properly adjusted according to the impact resistance of the occupant's side.

(6) The upside portion of the inflatable portion 46 is partitioned into between the shoulder-protecting inflatable portion 53 and the thorax-protecting inflatable portion 54 by the partitioning member 60. According to the present embodiment, by providing the pressure regulation valve 95 in the partitioning member 60, the thorax-protecting inflatable portion 54 can be set so as not to be deployed and inflated in the initial period of deployment and inflation of the inflatable portion 46. Accordingly, even when an obstacle is present in front of the seatback 14, the thorax-protecting inflatable portion 54 is prevented from pushing the obstacle.

Further, the present embodiment may be modified as in the following embodiments.

At least one of the upper-side member 66 and the lower-side member 67, which constitutes the partitioning member 60, may be divided into two parts along the folding line 61.

The opposite ends 62, 63 of the partitioning member 60 may be coupled to the fabric portions 43, 44 in the shoulder-protecting inflatable portion 53, or may be coupled in the thorax-protecting inflatable portion 54. Alternatively, one of the opposite ends 62, 63 may be coupled in the shoulder-protecting inflatable portion 53, and the other may be coupled in the thorax-protecting inflatable portion 54.

The internal opening 96 and the internal joint parts 73 may be obliquely crossed to the folding line 61 of the partitioning member 60, or may be provided along the folding line 61.

The partitioning member 60 may be formed by a single fabric.

In the above illustrated embodiment, portions between the internal opening 96 and the edges 68E, 69E function as the valve body elements 97, 98. Therefore, as long as the distal ends 97T, 98T of the valve body elements 97, 98 are closed in contact with each other at the time of deployment and inflation of the shoulder-protecting inflatable portion 53, portions not corresponding to the internal opening 96 may be changed. For example, portions of the overlapping portion 71 that do not correspond to the internal opening 96 may be coupled partly or entirely by sewing or adhesion. In this case, it may be arranged such that only portions corresponding to the internal opening 96 can be moved as the valve body elements 97, 98, and portions not corresponding to the internal opening 96 may be fixed so as not to be moved unnecessarily. Alternatively, a notch may be provided at portions of the overlapping portion 71 that do not correspond to the internal opening 96.

The partitioning member 60 and the valve body elements 97, 98 may be formed by different members.

The folding line 61 of the partitioning member 60 folded in half may be slightly inclined relative to the airbag module AM.

The position where the coupling between the internal joint parts 73 is cancelled may be a position deviated in a transverse direction from the folding line 61. The coupling between the internal joint parts 73 may be cancelled at multiple positions.

A pair of the overlapping portions 71 including the valve body elements 97, 98 may be arranged in the thorax-protecting inflatable portion 54.

The partitioning member 60 may be fitted to the inflatable portion 46 in an uninflated and deployed state, in a state of having the folding line 61 folded in half so as to be positioned downstream from the opposite ends 62, 63. In this case, before the deployment and inflation of the inflatable portion 46, the overlapping portion 71 including the valve body elements 97, 98 can be arranged in the thorax-protecting inflatable portion 54.

The upper and lower members 66, 67 of the partitioning member 60 may be overlapped such that the ends 68, 69 are overlapped in a band shape without matching the edges 68E, 69E together.

Substantially the entire airbag 40 may be the inflatable portion 46, or the airbag 40 can have the non-inflatable portion, like in the above described embodiment.

The inflatable portion may have a head-protecting-inflatable portion that protects the temporal, in addition to the shoulder-protecting inflatable portion 53 and the thorax-protecting inflatable portion 54.

The lumbar-region-protecting inflatable portion 52 may be deployed and inflated at the side of the entire lumbar region PP.

The lumbar-region-protecting inflatable portion 52 may project forward by breaking the seat pad 18 of the seatback 14.

In general, impact resistance of the thorax PT is higher at the rear half including the backbone and the ribs than at the front half not including structures such as the backbone and the ribs. Therefore, it is desirable that impact that act on the thorax PT by the upstream inflatable portion and the downstream inflatable portion be set smaller at the front half than at the rear half. In this respect, according to the above illustrated embodiment, the downstream inflatable portion is deployed and inflated at a lower internal pressure than that at the upstream inflatable portion. In this case, the upstream inflatable portion can be deployed and inflated at a side of the rear half of the thorax, and the downstream inflatable portion can be deployed and inflated at a side of the front half of the thorax. In this case, both of the upstream inflatable portion and the downstream inflatable portion become the thorax-protecting inflatable portion.

In the above illustrated embodiment, the internal pressure of the inflatable portion 46 is highest in the lumbar-region-protecting inflatable portion 52, and becomes low in the order of the upstream inflatable portion and the downstream inflatable portion. Alternatively, the upstream inflatable portion may be the thorax-protecting inflatable portion that is deployed and inflated at a side of the thorax PT, and the downstream inflatable portion may be deployed and inflated at the front side of the thorax-protecting inflatable portion. In this case, the downstream inflatable portion receives the inflation gas that flows out from the thorax-protecting inflatable portion, and exhibits a function of adjusting the internal pressure of the thorax-protecting inflatable portion.

A retainer having a closed upper end and an open lower end or a retainer having open upper and lower ends may be used.

The retainer 32 may be omitted. In this case, the inflator 31 may be directly fitted to the side frame portion 17 of the seatback 14.

The inflator assembly 30 may be provided outside the airbag 40. In this case, the inflator 31 and the upstream inflatable portion may be connected by a pipe, and the inflation gas may be supplied to the upstream inflatable portion from the inflator 31 through this pipe.

In place of the seatback 14, the accommodation portion 21 may be set in the body-side portion 11. Further, the airbag module AM may be incorporated in the accommodation portion 21 of the body-side portion 11.

Depending on the size, number, and positions of the vent holes 56, there is a risk that internal pressures of the thorax-protecting inflatable portion 54 and the shoulder-protecting inflatable portion 53 become lower than a proper value because the discharge volume of the inflation gas from the vent holes 56 becomes too large. In this case, the less-flexible part 92 may be arranged to move beyond the wail joint part 88, and the valve body elements 83, 84 may be inverted, to open the flow passage between the valve body elements 83 and 84. With this arrangement, the inflation gas in the lumbar-region-protecting inflatable portion 52 flows out to the shoulder-protecting inflatable portion 53, and therefore, the internal pressure of the shoulder-protecting inflatable portion 53 can be compensated for. By changing rigidity of the less-flexible part 92 and changing the length L3, the valve body elements 83, 84 may be inverted.

The rigidity of the less-flexible part 92 may be adjusted by changing the kind, the thickness, and the number of sewing threads. For example, by increasing the thickness and the number of the sewing threads, the less-flexible part 92 becomes rigid, and the internal pressure of the lumbar-region-protecting inflatable portion 52 required to invert the valve body elements 83, 84 becomes high. Further, if the less-flexible part 92 is made of an adhesive part, the rigidity of the less-flexible part 92 may be changed by changing the kind and the coating volume of an adhesive agent. For example, if the coating volume becomes large, the less-flexible part 92 becomes rigid, and the internal pressure of the lumbar-region-protecting inflatable portion 52 required to invert the valve body elements 83, 84 becomes high.

In the above illustrated embodiment, the positions of the first edge joint part 87 and the wall joint part 88 may be changed. The first edge joint part 87 may be the one that couples the front parts of the valve body elements 83, 84 to the corresponding communication walls 76, 77. Further, the wall joint part 88 may be the one that is provided near the first edge joint part 87 and also couples the communication walls 76, 77.

The less-flexible part 92 and the auxiliary joint part 93 may be provided at different positions of the valve body elements 83, 84. The auxiliary joint part 93 may be the one that is provided between the first edge joint part 87 and the second edge joint part 91 and couples between the valve body elements 83 and 84 near the second edge joint part 91, and also that extends from a vicinity of the lumbar-region-protecting inflatable portion 52 of the flexible part 89 to the lumbar-region-protecting inflatable portion 52. Further, the less-flexible part 92 may be modified as long as it is less flexible than the flexible part 89, is provided on or near the auxiliary joint part 93 of the check valve 80, and extend in the gas flow direction.

The check valve 80 may be formed by overlapping and coupling an independent pair of fabrics. In this case, the rear parts of the valve body elements 83, 84 are coupled by the second edge joint part 91.

The configuration of the less-flexible part 92 may be changed as long as the less-flexible part 92 extends in the gas flow direction and is also less flexible than the flexible part 89, on or near the auxiliary joint part 93 of the check valve 80. The less-flexible part 92 may be formed by plastic or metal, for example.

In the above illustrated embodiment, although the less-flexible part 92 is set in parallel with the second edge joint part 91. However, the less-flexible part 92 may be set to cross the second edge joint part 91. With this arrangement, the flow rate of the inflation gas G may be adjusted by adjusting the flow passage area DS between the valve body elements 83 and 84. For example, by setting the less-flexible part 92 to cross the second edge joint part 91 at a large angle, the flow passage area DS becomes small, and the flow rate of the inflation gas that flows into the lumbar-region-protecting inflatable portion 52 becomes small.

The present invention may be applied to a side airbag apparatus in which the interior of the airbag 40 is partitioned into multiple inflatable portions by a tether. In this case, a check valve may be provided in the tether.

The inclined part 94 may be omitted from the valve body elements 83, 84.

The outflow side joint parts 85, 86 may extend in a direction not orthogonal to the flow direction of the inflation gas that flows through the communication passage 75.

The present invention may be applied to a car 10 that includes a seat 12 having a seatback 14 facing a side. This side airbag apparatus can protect an occupant P from impact applied from the front and rear the car 10.

The side airbag apparatus of the present invention may be applied to various industrial vehicles other than private automobiles.

The present invention may be applied to a side airbag apparatus installed in a vehicle seat for vehicles such as aircrafts and vessels.

The invention claimed is:

1. A side airbag apparatus comprising an airbag, wherein
the airbag has a lumbar-region-protecting inflatable portion, an upstream inflatable portion, and a downstream inflatable portion, which are inflated by inflation gas,
the lumbar-region-protecting inflatable portion is deployed and inflated at a side of the lumbar region of an occupant seated on a vehicle seat,
the upstream inflatable portion is adjacent to an upper side of the lumbar-region-protecting inflatable portion via a communication passage and is deployed and inflated at an internal pressure lower than that of the lumbar-region-protecting inflatable portion,
the downstream inflatable portion is adjacent to a front side of the upstream inflatable portion via a planar partitioning member and is deployed and inflated by inflation gas that has passed through the upstream inflatable portion,
at least one of the upstream inflatable portion and the downstream inflatable portion is a thorax-protecting inflatable portion, which is deployed and inflated at a side of the thorax of the occupant,
a check valve that restricts outflow of inflation gas from the lumbar-region-protecting inflatable portion to the upstream inflatable portion is provided in the communication passage,
a pressure regulation valve that has an opening and a pair of valve body elements is provided in the partitioning member,
the valve body elements are arranged to be brought into contact with each other by being pushed by inflation gas in the upstream inflatable portion which is not receiving external force from the occupant, thereby restricting flow of inflation gas at the opening, and
the valve body elements are arranged to be flexed and separated from each other by the external force received by the upstream inflatable portion which restrains the occupant, thereby permitting flow of inflation gas at the opening.

2. The side airbag apparatus according to claim 1, wherein
the upstream inflatable portion is a shoulder-protecting inflatable portion, which is deployed and inflated at a side of a shoulder of the occupant, and
the downstream inflatable portion is the thorax protecting inflatable portion.

3. The side airbag apparatus according to claim 1, wherein
the lumbar-region-protecting inflatable portion is deployed and inflated at a side of at least a rear part of the lumbar region.

4. The side airbag apparatus according to claim 3, wherein
the airbag is accommodated inside the vehicle seat, and
the lumbar-region-protecting inflatable portion is deployed and inflated inside the vehicle seat.

5. The side airbag apparatus according to claim 1, wherein a vent hole for inflation gas is provided in the downstream inflatable portion.

\* \* \* \* \*